(12) United States Patent
Luo et al.

(10) Patent No.: US 11,802,971 B2
(45) Date of Patent: Oct. 31, 2023

(54) REAL-TIME KINEMATIC (RTK) AND DIFFERENTIAL GLOBAL NAVIGATION SATELLITE SYSTEM (DGNSS) CORRECTIONS USING MULTIPLE REFERENCE STATIONS

(71) Applicant: QUALCOMM Incorporated, San Diego, CA (US)

(72) Inventors: Ning Luo, Cupertino, CA (US); Min Wang, Tustin, CA (US); Gengsheng Zhang, Cupertino, CA (US); Bo Zheng, Sunnyvale, CA (US); Yinghua Yang, San Jose, CA (US); Han Zhang, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 108 days.

(21) Appl. No.: 17/190,116

(22) Filed: Mar. 2, 2021

(65) Prior Publication Data

US 2022/0283314 A1 Sep. 8, 2022

(51) Int. Cl.
*G01S 19/07* (2010.01)
*G01S 19/41* (2010.01)
(Continued)

(52) U.S. Cl.
CPC ............ *G01S 19/07* (2013.01); *G01S 19/071* (2019.08); *G01S 19/41* (2013.01); *G01S 19/43* (2013.01); *G01S 19/44* (2013.01)

(58) Field of Classification Search
CPC ........ G01S 19/07; G01S 19/071; G01S 19/41; G01S 19/44; G01S 19/43
(Continued)

(56) References Cited

U.S. PATENT DOCUMENTS 7,586,438 B1 * 9/2009 Lawrence ............... G01S 5/009
   701/445
8,624,779 B2 * 1/2014 Ferguson ............... G01S 19/04
   342/357.58
(Continued)

FOREIGN PATENT DOCUMENTS

CN 110545519 12/2019
JP 2007248177 9/2007
(Continued)

OTHER PUBLICATIONS

Partial International Search Report—PCT/US2022/070080—ISA/EPO—dated Jun. 1, 2022.
(Continued)

*Primary Examiner* — Chuong P Nguyen
(74) *Attorney, Agent, or Firm* — QUALCOMM Incorporated

(57) ABSTRACT

An Real-Time Kinematic (RTK) and/or Differential GNSS (DGNSS) system is disclosed in which correction data from a plurality of reference stations is provided to the mobile device. A selection of reference stations (from which correction data is provided to the mobile device) can be made based on factors such as the approximate location of the mobile device, geometry of the reference stations, and/or other factors. The mobile device can combine the correction data from the plurality of reference stations in different ways to determine an accurate position fix for the mobile device, without interpolating correction data from the plurality of reference stations.

40 Claims, 15 Drawing Sheets

(51) Int. Cl.
*G01S 19/44* (2010.01)
*G01S 19/43* (2010.01)

(58) Field of Classification Search
USPC ............. 342/357.24, 357.26, 357.27, 357.44
See application file for complete search history.

(56) References Cited

U.S. PATENT DOCUMENTS

| | | | |
|---|---|---|---|
| 9,250,327 B2* | 2/2016 | Kelley ................. | G01S 19/071 |
| 9,696,431 B2 | 7/2017 | Wirola | |
| 10,422,885 B2 | 9/2019 | Dai et al. | |
| 10,473,790 B2* | 11/2019 | Noble ................... | G01S 19/072 |
| 10,605,926 B2 | 3/2020 | Lie et al. | |
| 10,627,527 B2* | 4/2020 | Horn ...................... | G01S 19/51 |
| 10,809,388 B1* | 10/2020 | Carcanague .......... | G01S 19/252 |
| 11,035,961 B2* | 6/2021 | Horn ...................... | G01S 19/51 |
| 11,061,141 B2* | 7/2021 | Noble ................... | G01S 19/04 |
| 11,237,276 B2* | 2/2022 | Kleeman ............... | G01S 19/071 |
| 11,372,114 B2* | 6/2022 | Carcanague ........... | G01S 19/52 |
| 11,668,840 B2* | 6/2023 | Wang ..................... | G01S 19/43 |
| | | | 342/357.24 |
| 2008/0096527 A1 | 4/2008 | Lamba et al. | |
| 2010/0013701 A1 | 1/2010 | Fischer et al. | |
| 2011/0285586 A1* | 11/2011 | Ferguson ................ | G01S 19/04 |
| | | | 342/357.45 |
| 2015/0050907 A1* | 2/2015 | Rudow .................. | H04W 4/023 |
| | | | 455/404.2 |
| 2015/0168560 A1 | 6/2015 | Ralphs et al. | |
| 2015/0247931 A1* | 9/2015 | Leandro ................ | G01S 19/074 |
| | | | 342/357.44 |
| 2018/0246220 A1 | 8/2018 | Zhang et al. | |
| 2018/0299562 A1 | 10/2018 | Green | |
| 2018/0321387 A1 | 11/2018 | Takahashi et al. | |
| 2019/0196022 A1 | 6/2019 | Rezaei et al. | |
| 2019/0324149 A1 | 10/2019 | Lin | |
| 2020/0371252 A1* | 11/2020 | Cash ....................... | G01S 19/07 |
| 2021/0318446 A1* | 10/2021 | Kishimoto .............. | G01S 19/07 |
| 2021/0382181 A1* | 12/2021 | Grgich ................... | G01S 19/41 |
| 2022/0057529 A1* | 2/2022 | Wang ..................... | G01S 19/072 |
| 2022/0107427 A1* | 4/2022 | Kleeman ................ | G01S 19/07 |
| 2023/0062246 A1* | 3/2023 | Wang ..................... | G01S 19/41 |

FOREIGN PATENT DOCUMENTS

| | | | | |
|---|---|---|---|---|
| KR | 20140045087 | | 4/2014 | |
| WO | WO 2015168460 | | 11/2015 | |
| WO | WO-2019220413 | | 11/2019 | |
| WO | WO 2020105689 | | 5/2020 | |
| WO | WO 2021090097 | | 5/2021 | |
| WO | WO-2021090097 A1 * | | 5/2021 | ........... G01S 19/071 |

OTHER PUBLICATIONS

Qualcomm Incorporated: "Introduction of Real-Time Kinematic (RTK) Positioning", 3GPP TSP-RAN WG2 Meeting #98, 3GPP Draft, R2-1704759_ (RTK Positioning), 3rd Generation Partnership Project (3GPP), Mobile Competence Centre, 650, Route Des Lucioles, F-06921 Sophia-Antipolis Cedex, France, vol. RAN WG2, No. Hangzhou, May 15, 2017-May 19, 2017, May 7, 2017 (May 7, 2017), pp. 1-37, XP051265096, Retrieved from the Internet: URL: http://www.3gpp.org/ftp/tsg_ran/WG2_RL2/TSGR2_98/Docs/, [retrieved on May 7, 2017] p. 13, paragraph 3.3—p. 14, paragraph 3.3.1.

Lopez E., et al., "Performance Comparison of Precise Point Positioning using real-time Oriented GNSS Products", Conference Paper: Mar. 2019, DOI: 10.1109/CAE.2019.8709289, 7 Pages.

International Search Report and Written Opinion—PCT/US2022/070080—ISA/EPO—dated Sep. 16, 2022.

Kaplan E., (ED): "Understanding GPS: Principles and Applications, Passages", Jan. 1, 1996, Understanding GPS and Principles and Applications, Boston [U.A.], Artech House, US, pp. 314-319, p. 343, XP002632313, 10 Pages, paragraph 8.2.1.4.

* cited by examiner

REAL-TIME KINEMATIC (RTK) AND DIFFERENTIAL GLOBAL NAVIGATION SATELLITE SYSTEM (DGNSS) CORRECTIONS USING MULTIPLE REFERENCE STATIONS

BACKGROUND

1. Field of Invention

The present invention relates generally to the field of satellite-based positioning, and more specifically to error correction of Global Navigation Satellite System (GNSS) terms for more accurate position determination.

2. Description of Related Art

Precise positioning services (PPS) offer highly-accurate, meter-level or sub-meter-level positioning of a mobile device exceeding the accuracy of traditional consumer-grade Global Navigation Satellite System (GNSS) receivers. PPS includes services such as Precise Point Positioning (PPP), Real-Time Kinematic (RTK), and Differential GNSS (DGNSS). These services often perform network-based interpolation of reference station data to provide correction data (e.g., reference measurements) to the mobile station for positioning, vary in accuracy, availability, and reliability. For a highly-accurate position determination of a mobile device, traditional PPS may take a relatively long time (e.g., several minutes or longer). In many traditional applications, such as land survey, a faster position determination may not be needed. However, if a PPS is able to provide a relatively fast determination of a highly accurate position, it may be useful in a variety of modern applications.

BRIEF SUMMARY

Embodiments described herein below address these and other issues by providing an RTK/DGNSS system in which correction data from a plurality of reference stations is provided to the mobile device. In particular, a selection of reference stations can be made based on factors such as the approximate location of the mobile device, geometry of the reference stations, and/or other factors. The mobile device can combine the correction data from the plurality of reference stations in any of a variety of ways to determine an accurate position fix for the mobile device. The selection of reference stations can be made by a service provider communicatively coupled with the mobile device via any combination of public and/or private networks.

An example method of providing reference station correction data to a mobile device for real-time kinematic (RTK) or differential global navigation satellite system (DGNSS) corrections, according to this disclosure, comprises receiving information indicative of an approximate location of the mobile device or information regarding satellite vehicles visible to the mobile device. The method also comprises selecting a plurality of reference stations from which to obtain the reference station correction data, where the selecting is based, at least in part, on the approximate location of the mobile device or the information regarding satellite vehicles visible to the mobile device. The method also comprises obtaining the reference station correction data from each reference station of the plurality of reference stations, where, for each reference station, the reference station correction data may comprise data based on one or more measurements taken by a GNSS receiver at the respective reference station. The method also comprises sending the reference station correction data to the mobile device.

An example method of applying real-time kinematic (RTK) or differential global navigation satellite system (DGNSS) corrections at a mobile device, according to this disclosure, comprises obtaining, at the mobile device, reference station correction data from each reference station of a plurality of reference stations, where, for each reference station, the reference station correction data may comprise one or more measurements taken by a GNSS receiver at the respective reference station. The method also comprises obtaining mobile device measurement data, where the mobile device measurement data may comprise one or more measurements taken by a GNSS receiver at the mobile device. The method also comprises determining a location of the mobile device based on the reference station correction data from each reference station of the plurality of reference stations and the mobile device measurement data.

An example computer server for providing reference station correction data to a mobile device for real-time kinematic (RTK) or differential global navigation satellite system (DGNSS) corrections, according to this disclosure, comprises a transceiver, a memory, and one or more processing units communicatively coupled with the transceiver and the memory. The one or more processing units are configured to receive information indicative of an approximate location of the mobile device or information regarding satellite vehicles visible to the mobile device. The one or more processing units are further configured to select a plurality of reference stations from which to obtain the reference station correction data, where the selecting is based, at least in part, on the approximate location of the mobile device or the information regarding satellite vehicles visible to the mobile device. The one or more processing units are further configured to obtain the reference station correction data from each reference station of the plurality of reference stations, where, for each reference station, the reference station correction data may comprise data based on one or more measurements taken by a GNSS receiver at the respective reference station. The one or more processing units are further configured to send, via the transceiver, the reference station correction data to the mobile device.

An example mobile device for applying real-time kinematic (RTK) or differential global navigation satellite system (DGNSS) corrections, according to this disclosure, comprises a transceiver, a GNSS receiver, a memory, and one or more processing units communicatively coupled with the transceiver, GNSS receiver, and the memory. The one or more processing units are configured to obtain, via the transceiver, reference station correction data from each reference station of a plurality of reference stations, where, for each reference station, the reference station correction data may comprise one or more measurements taken by a GNSS receiver at the respective reference station. The one or more processing units are also configured to obtain mobile device measurement data, where the mobile device measurement data may comprise one or more measurements taken by the GNSS receiver of the mobile device. The one or more processing units are also configured to determine a location of the mobile device based on the reference station correction data from each reference station of the plurality of reference stations and the mobile device measurement data.

An example device for providing reference station correction data to a mobile device for real-time kinematic (RTK) or differential global navigation satellite system (DGNSS) corrections, according to this disclosure, comprises means for receiving information indicative of an approximate location of the mobile device or information regarding satellite vehicles visible to the mobile device. The device also comprises means for selecting a plurality of reference stations from which to obtain the reference station correction data, where the selecting is based, at least in part, on the approximate location of the mobile device or the information regarding satellite vehicles visible to the mobile device. The device also comprises means for obtaining the reference station correction data from each reference station of the plurality of reference stations, where, for each reference station, the reference station correction data may comprise data based on one or more measurements taken by a GNSS receiver at the respective reference station. The device also comprises means for sending the reference station correction data to the mobile device.

An example device for applying real-time kinematic (RTK) or differential global navigation satellite system (DGNSS) corrections at a mobile device, according to this disclosure, comprises a means for obtaining, at the mobile device, reference station correction data from each reference station of a plurality of reference stations, where, for each reference station, the reference station correction data may comprise one or more measurements taken by a GNSS receiver at the respective reference station. The device also comprises means for obtaining mobile device measurement data, where the mobile device measurement data may comprise one or more measurements taken by a GNSS receiver at the mobile device. The device also comprises means for determining a location of the mobile device based on the reference station correction data from each reference station of the plurality of reference stations and the mobile device measurement data.

An example non-transitory computer-readable medium, according to this disclosure, stores instructions for providing reference station correction data to a mobile device for real-time kinematic (RTK) or differential global navigation satellite system (DGNSS) corrections. The instructions comprise code for receiving information indicative of an approximate location of the mobile device or information regarding satellite vehicles visible to the mobile device. The instructions also comprise code for selecting a plurality of reference stations from which to obtain the reference station correction data, where the selecting is based, at least in part, on the approximate location of the mobile device or the information regarding satellite vehicles visible to the mobile device. The instructions also comprise code for obtaining the reference station correction data from each reference station of the plurality of reference stations, where, for each reference station, the reference station correction data may comprise data based on one or more measurements taken by a GNSS receiver at the respective reference station. The instructions also comprise code for sending the reference station correction data to the mobile device.

An example non-transitory computer-readable medium, according to this disclosure, stores instructions for applying real-time kinematic (RTK) or differential global navigation satellite system (DGNSS) corrections at a mobile device. The instructions comprise code for obtaining, at the mobile device, reference station correction data from each reference station of a plurality of reference stations, where, for each reference station, the reference station correction data may comprise one or more measurements taken by a GNSS receiver at the respective reference station. The instructions also comprise code for obtaining mobile device measurement data, where the mobile device measurement data may comprise one or more measurements taken by a GNSS receiver at the mobile device. The instructions also comprise code for determining a location of the mobile device based on the reference station correction data from each reference station of the plurality of reference stations and the mobile device measurement data.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure.

As used herein, the terms "position" and "location" are used interchangeably. Further, terms such as "position determination," "position fix," "location estimate," "estimated location," "location fix," and the like are also used interchangeably herein with regard to GNSS-based positioning to refer to an estimated position of a mobile device or other device comprising a GNSS receiver. The position or location may be a two-dimensional position, e.g., with regard to two-dimensional map, or a three-dimensional position.

Additionally, as used herein, the term "correction data" may refer to corrective information provided by an RTK service provided to enable a high-accuracy position determination of a device having a GNSS receiver. Correction data can include measurement data taken by a reference station and/or corrective information derived from the measurement data, such as a difference between a true range determination, based on a known location of a reference station, and a measurement taken at the reference station. Corrective data can be used as described herein, along with measurements taken at the device having the GNSS receiver, to determine the high-accuracy position of the device.

Figure 1:
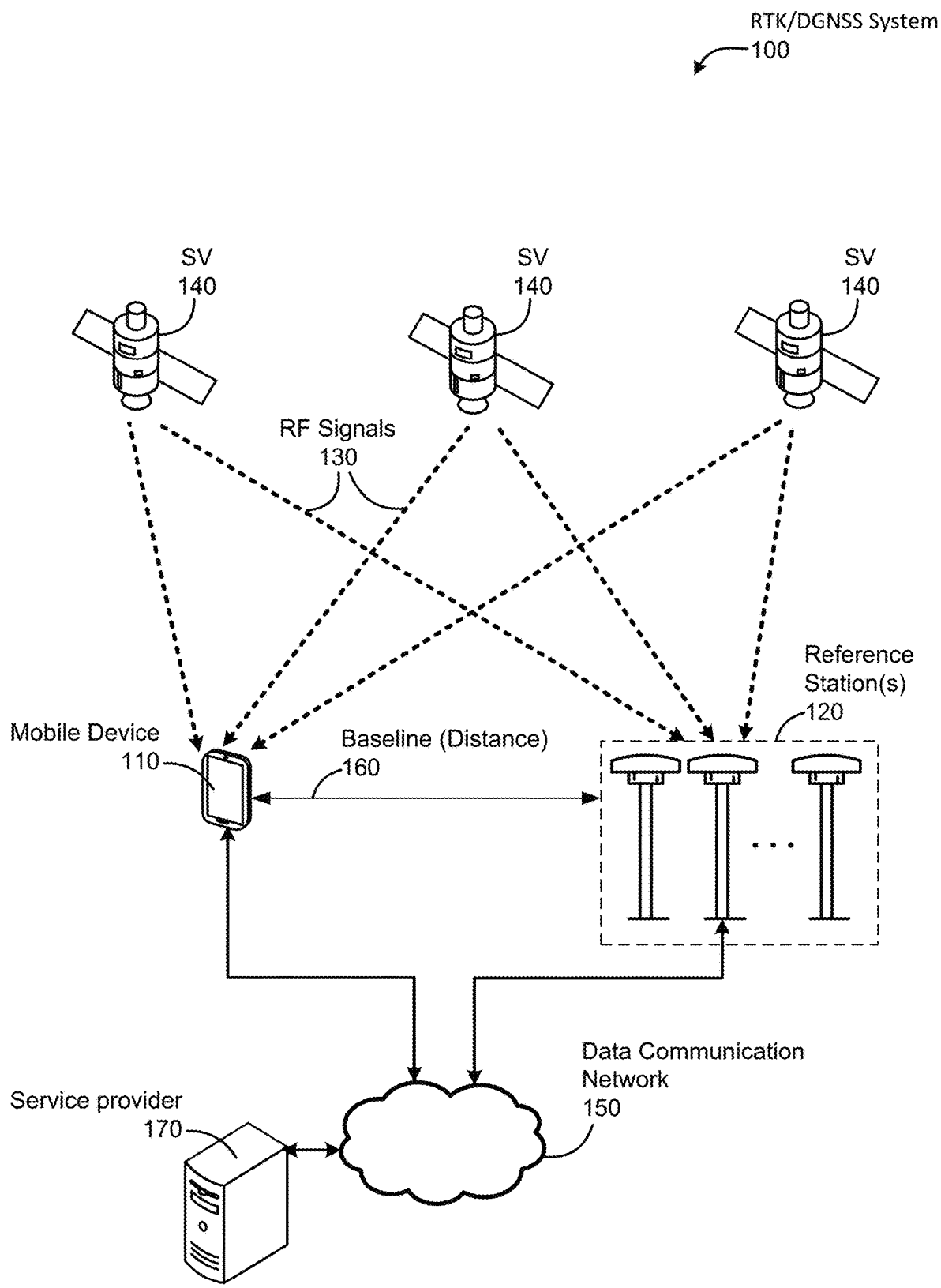
FIG. 1 is a simplified diagram of a Real-Time Kinematic (RTK) and Differential GNSS (DGNSS) system, according to an embodiment.

FIG. 1 is a simplified diagram of a Real-Time Kinematic (RTK) and Differential GNSS (DGNSS) system, according to an embodiment. The RTK/DGNSS system 100 enables a highly accurate (e.g., sub-meter) GNSS position fix of a mobile device 110 (also known as a "rover station" or "rover") by using GNSS receivers at both the mobile device 110 and one or more reference stations 120 (also known as "base stations") that receive radio frequency (RF) signals 130 from satellite vehicles (SVs) 140 (GNSS satellites) from one or more GNSS constellations (e.g., Global Position System (GPS), Galileo (GAL), global navigation Satellite System (GLONASS), Beidou, etc.). Types of mobile devices 110 used may vary, depending on application, and may include any of a variety of types of devices having access to GNSS positioning data, such as mobile devices equipped with GNSS receivers. Such mobile devices may include, for example consumer electronics or other mobile consumer devices, such as a mobile phone, tablet, laptop, wearable device, vehicle, or the like. In some embodiments, the mobile device 110 may comprise industrial equipment, such as survey equipment.

In GNSS-based positioning, the mobile device 110 can use code-based positioning to determine a distance of each of the SVs 140 based on a determined delay in a generated pseudorandom binary sequence received in the RF signals 130. The mobile device 110 can further accurately calculate the location of each SV 140 at a specific moment in time using ephemeris (or navigation) data regarding the SVs 140. With the distance and location information of the SVs 140, the mobile device 110 can then determine a position fix for its location using traditional GNSS techniques. This position fix may be determined, for example, by a Standalone Positioning Engine (SPE) executed by one or more processors of the mobile device 110. However, the resulting accuracy of the position fix for mobile device 110 is subject to errors caused by SV 140 orbit and clock, ionosphere and troposphere delays, and other phenomena. Although this can provide accuracy on the order of meters, this accuracy may be insufficient for many applications.

DGNSS provides an enhancement to traditional GNSS positioning by providing correction data from a reference station 120 with a known, fixed location. More specifically, a reference station 120 uses a highly-accurate GNSS receiver to take GNSS measurements of RF signals 130, which is provided to the mobile device 110 (e.g., via radio broadcast and/or data communication network 150, such as the Internet) along with the known location of the reference station 120. The mobile device can then use the correction data (which can include measurement data and location information of the reference station 120, or correction information derived therefrom) to enhance GNSS-based positioning by making corrections to the measured distances (pseudoranges) to each of the SVs 140. This more accurate position fix may be determined, for example, by a Precise Positioning Engine (PPE) executed by one or more processors of the mobile device 110.

RTK positioning can provide an even more accurate solution (e.g., on the order of centimeters or decimeters) by using carrier-based ranging based on the carrier wave of the RF signals 130. Similar to DGNSS, RTK positioning can use a reference station 120 to make measurements of RF signals 130 with a highly-accurate GNSS receiver from a known location. Unlike DGNSS, however, RTK correction data (also known as "RTK service data") includes highly-accurate carrier-based ranging. RTK correction data may be related to the mobile device 110 via radio broadcasts and/or data communication network 150. The mobile device 110 can then use the RTK correction data to correct errors in its own carrier-based ranging using measurements of the RF signals 130 from its own GNSS receiver. Error correction for RTK positioning can include correction of satellite clock and orbit, ionospheric and tropospheric delays, phase wind-up, site displacement including solid earth tide, ocean loading, and/or pole tide. This more accurate position fix (i.e., position) may be determined, for example, by a PPE executed by one or more processors of the mobile device 110. More specifically, in addition to the information provided to an SPE, the PPE may use RTK correction data, to provide a high accuracy, carrier-based position fix. Several GNSS techniques can be adopted in PPE, such as DGNSS, RTK, and PPP.

A mobile device 110 can determine its position using a location/position estimator or positioning engine (e.g., PPE) that incorporates ambiguity resolution and differential correction. The location/position estimator may use estimation techniques such as by using an Extended Kalman Filter (EKF), Weighted Least Squares (WLS), a hatch filter, particle filter, or the like. The accuracy of the position fix for the mobile device 110 can depend on its distance, or "baseline" 160, from the reference station 120; the accuracy of the differential corrections; and the like. Although traditional DGNSS and RTK correction has been limited to a baseline 160 on the order of kilometers or tens of kilometers, new techniques may extend the baseline 160 to far greater distances using enhanced techniques for error correction. For example, Ultra-Long Baseline RTK (ULB-RTK) can use a multi-constellation, multi-frequency (MCMF) GNSS receiver at the mobile device 110 and tropospheric modeling to perform correction of errors arising from ionospheric and tropospheric delays, allowing for a baseline 160 of up to 1000 km or more. Because of this increased distance, there may be fewer SVs 140 that are observable by both the mobile device 110 and the reference station 120. These SVs 140 are referred to herein as "common-view satellites."

DGNSS and RTK positioning can be further enhanced using network-based techniques. In the network-based DGNSS/RTK, correction data from a plurality of reference stations 120 is sent to a service provider 170. The mobile device 110 can then receive on-demand DGNSS/RTK correction data by sending a request to the service provider 170, including an approximate location of the mobile device 110 (e.g., based on a previously-known position, non-GNSS-based positioning (such as a tracking area in a wireless communications network or dead reckoning-based positioning of a vehicle), etc.). The service provider 170, which may comprise one or more computer servers, can then provide customized DGNSS/RTK service data for the mobile device 110 by interpolating the correction data from the plurality of reference stations 120 to provide DGNSS/RTK service data for the approximate location of the mobile device 110. To interpolate the correction data, the service provider 170 may execute sophisticated GNSS algorithms based on the geometry of the reference stations 120 used. Because of the sophistication of the interpolated solution, the convergence time (the length of time it takes to obtain a high-accuracy position determination) can be relatively long. And, as previously noted, although this may not be a problem in applications in which a relatively long convergence time is acceptable (e.g., land survey), it can be problematic in other applications where time and safety may be critical (e.g., autonomous driving).

Embodiments described herein below address these and other issues by providing an RTK/DGNSS system 100 in which single reference station-based DGNSS/RTK service data (also referred to herein as reference station correction data) from each of a plurality of reference stations 120 is provided to the mobile device 110. In some embodiments, such DGNSS/RTK service data based on or associated with a single reference station may be non-interpolated DGNSS/RTK service data. As described in further detail below, a selection of reference stations 120 can be made based on factors such as the approximate location of the mobile device, geometry of the reference stations 120, and/or other factors. Additionally, as also described in detail below, the mobile device 110 can combine the correction data from the plurality of reference stations 120 in any of a variety of ways to determine an accurate position fix for the mobile device 110. The selection of reference stations 120 can be made by one or more computer servers (e.g., service provider 170) communicatively coupled with the reference stations 120 and mobile device 110 via a data communication network 150. As noted, the data communication network 150 may comprise any of a variety of public and/or private networks, which may include the Internet, one or more mobile carrier networks, and/or other such Wide Area Networks (WANs).

As noted, based on the approximate position of the mobile device, two or more relevant reference stations 120 may be selected from which correction data may be provided to the mobile device 110. The number of reference stations, N, for which the server provides correction information may vary, depending on quality of service (QOS) or user requests. N additionally or alternatively may be application-specific, increasing if higher accuracy, availability, and/or reliability is needed, and other limitations (e.g., processing capabilities of the mobile device 110) allow. FIGS. 2-5 are diagrams illustrating algorithms that may be used for such reference station selection.

Figure 2:
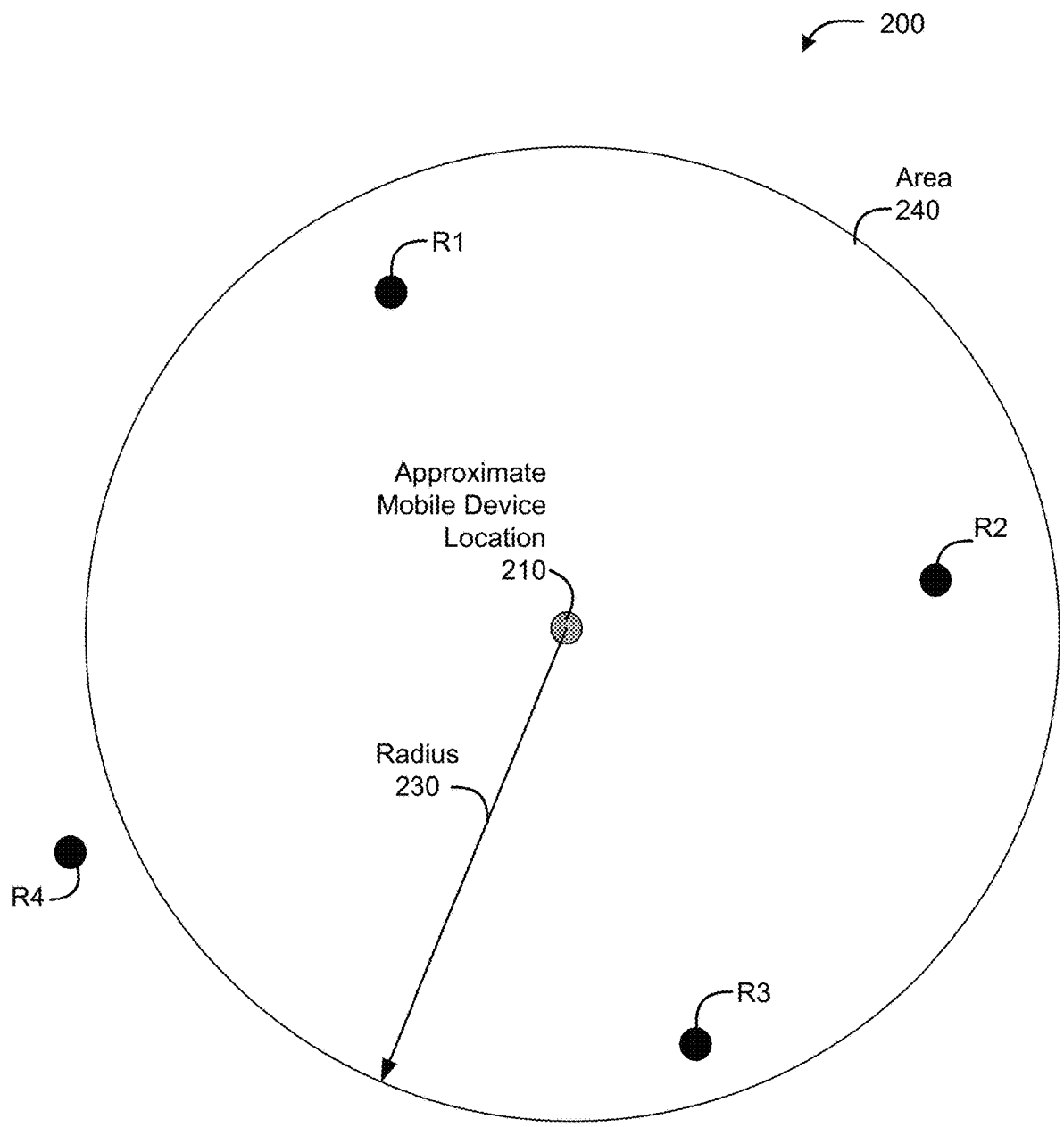
FIGS. 2 and 3 are diagrams of overhead views of a mobile device and multiple reference stations illustrating algorithms that may be used for reference station selection, according to some embodiments.

FIG. 2 is a diagram 200 of an overhead view of the positions of four reference stations, R1-R4, relative to an approximate mobile device location 210. As used herein, the notation "R" (e.g., R1-R4) may correspond to the position of a reference station (e.g., reference stations 120 of an RTK/DGNSS system 100, as shown in FIG. 1) and/or the reference stations themselves. The approximate mobile device location 210 may correspond to the location of a mobile device (e.g., mobile device 110) within a geographic region serviced by an RTK/DGNSS system 100.

The reference station selection method illustrated in FIG. 2 is proximity-based. That is, reference stations may be selected based on their proximity to the approximate mobile device location 210. This may be determined using a radius 230, as illustrated, which can be used in different ways. In some embodiments, for instance, the reference station selection process may involve starting with a small radius 230 and increasing the size of the radius 230 until a desired number of reference stations, N, fall within area 240 covered by the radius 230. Additional or alternative techniques may be used to determine the number N of reference stations closest to the approximate mobile device location 210. Alternatively, embodiments may have a radius 230 of a predetermined length and may select all reference stations that fall within the area 240 defined by the predetermined radius 230. Once reference stations are selected, correction data from the reference stations can be provided to the mobile device. In the example illustrated in FIG. 2, reference stations R1-R3 fall within the area 240 defined by the radius 230 and are therefore selected. Reference station R4, on the other hand, is not selected.

As an alternative to a radius-based technique, embodiments may reference stations based on geo-fencing, or predetermined areas. For example, a geographic region serviced by a service provider 170 of an RTK/DGNSS system 100 may be divided into a plurality of predetermined areas, where each predetermined area has a corresponding set of predetermined reference stations servicing the respective predetermined area. Accordingly, if the approximate mobile device location 210 falls within a predetermined area, the corresponding set of predetermined reference stations may be selected. An example of how this may be implemented is described hereafter with regard to FIG. 5.

It can be noted that, depending on network capabilities, the density of the reference stations may vary. In some embodiments of an RTK/DGNSS system 100, reference stations R1-R4 may be located only a few kilometers apart. In other embodiments, such as in an RTK/DGNSS system 100 implementing ULB-RTK, reference stations may be hundreds of kilometers apart or more. The location and density of the reference stations also may vary based on geographic region.

The approximate mobile device location 210 may be determined in any of a variety of ways, depending on desired functionality. In some embodiments, the approximate mobile device location 210 may be determined based on a previously-determined GNSS-based position fix (e.g., GNSS, RTK, or DGNSS). In some embodiments, the approximate mobile device location 210 may be determined by the mobile device or a server using network-based positioning techniques which may use RF signals to perform multilateration and/or multiangulation of the mobile device to determine the mobile devices location, based on known positions of RF transceivers (e.g., Wi-Fi access points, cellular network-based stations, etc.).

Figure 3:
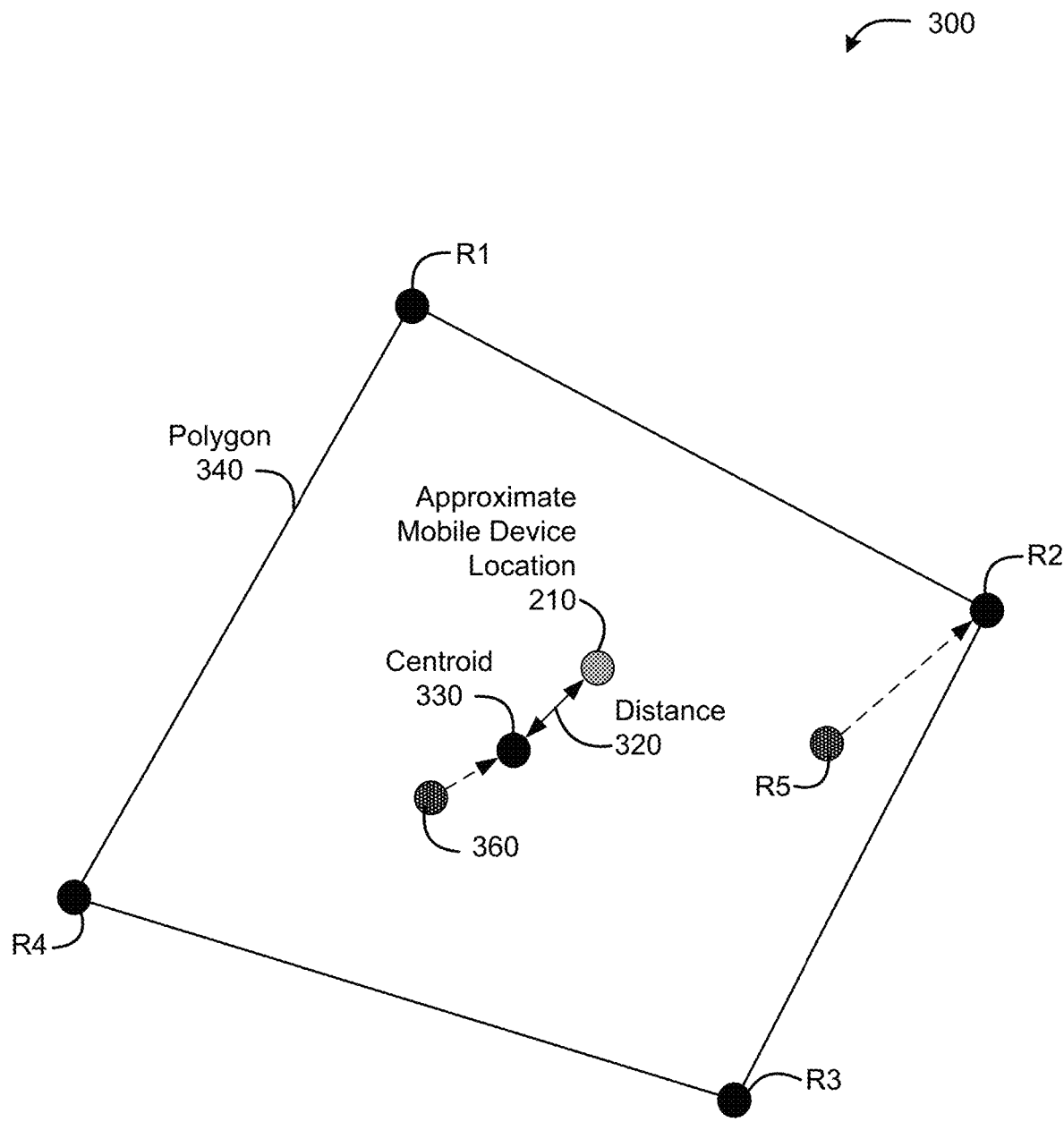

FIG. 3 is a diagram 300 of positions R1-R4 of four reference stations and approximate mobile device location 210, similar to FIG. 2. In this example, however, reference station selection is not based solely on proximity to the approximate mobile device location 210. Instead, a "balanced" group of reference stations is selected so that a distance 320 is minimized between the approximate mobile device location 210 and a centroid 330 of a polygon 340 formed by the locations of the selected reference stations. If two reference stations are selected, embodiments would minimize a distance between the midpoint of a line formed between the two reference stations and the approximate mobile device location 210. In some aspects, the "balanced" group may be selected with a fixed number N of reference stations, which may be selected or predetermined according to one or more of the above described aspects.

It can be noted that this balanced approach does not necessarily result in selecting the most proximate reference stations. As illustrated in FIG. 3, if a reference station R5 is selected instead of reference station R2, the resulting centroid 360 of a polygon formed by R1, R5, R3, and R4 is actually farther away than the centroid 330 formed if R2 is used, even though R5 is closer to the approximate mobile device location 210 than R2. Selecting R2 rather than R5 moves the centroid in the direction illustrated by the dashed arrows.

This balanced approach may be beneficial in different scenarios. For example, the mobile device may be surrounded by buildings or geographical features that block a certain portion of the sky. Reference stations may be similarly surrounded by such buildings or geographical features. Thus, even a nearby reference station may be incapable of providing sufficient correction data for satellites viewable by the mobile device. However, by providing a balanced selection of reference stations on various opposing sides of the approximate mobile device location 210, embodiments can help increase a number of common-view satellites between the mobile device and selected reference stations.

For similar reasoning, this balanced selection of reference stations can be beneficial in an RTK/DGNSS system having a dispersed network of reference stations where reference stations are hundreds or thousands of kilometers apart. In such a system, a mobile device may not have many common-view satellites with any given reference station. However, by receiving a balanced group of reference stations, embodiments can help increase the number of common-view satellites between the mobile device and selected reference stations. Generally speaking, increasing the number of common-view satellites results in increased accuracy of the respective position determination. In particular example, having a set of three or more satellites visible to both the mobile device and at least one of the reference stations can help ensure error correction for at least the minimum number of satellites used for position determination. That said, embodiments can be used even if fewer (or no) common-view satellites are available. With regard to common-view satellites, another technique for reference station selection may be used, as illustrated in FIG. 4.

Figure 4:
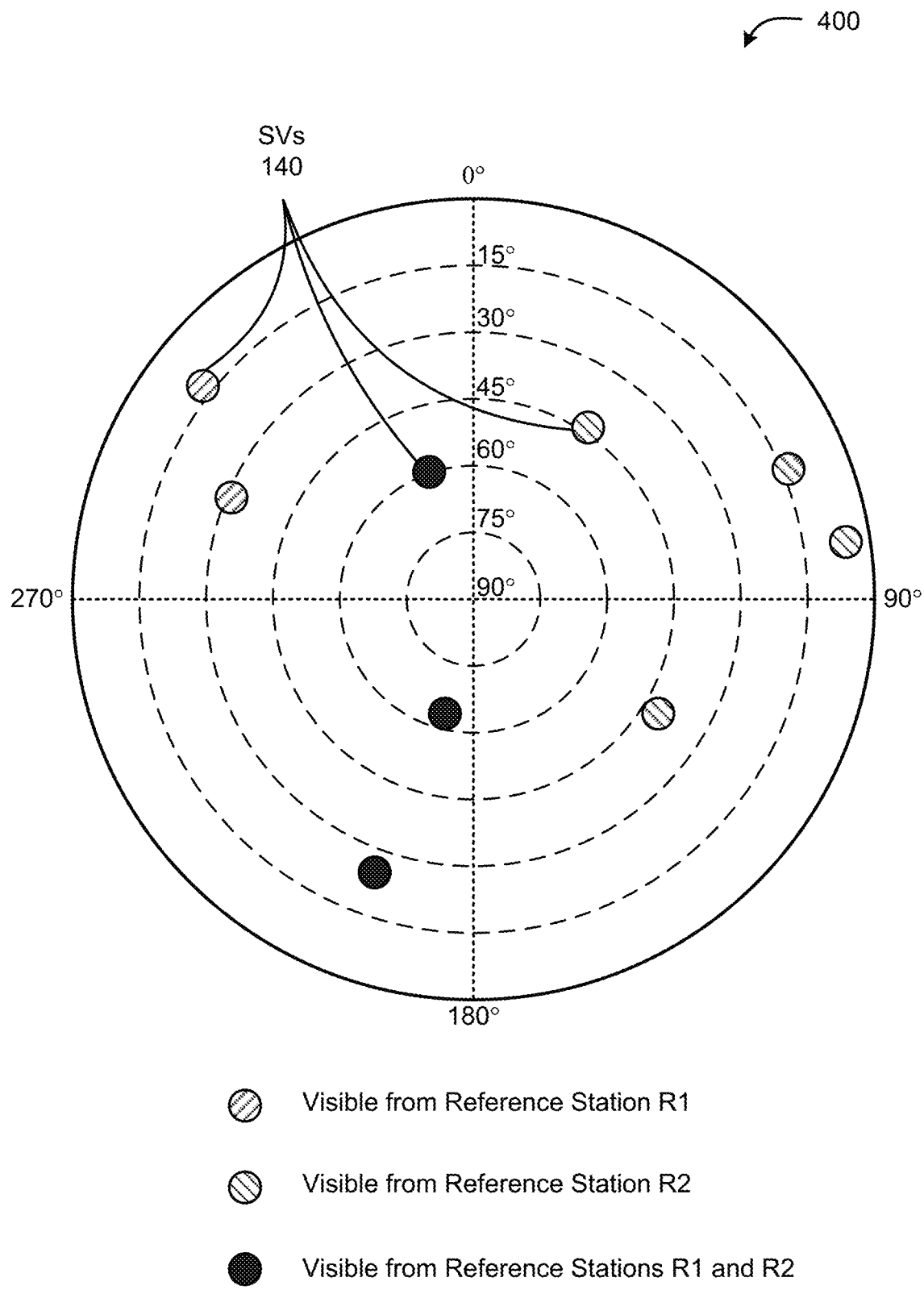
FIG. 4 is an example skyplot that charts the azimuth and elevation of various satellites that are viewable (observable) by reference stations R1 and R2.

FIG. 4 is a skyplot 400 that charts the azimuth and elevation of various SVs 140 that are viewable (observable) by reference stations R1 and R2. It can be noted that only a portion of SVs are labeled, to avoid clutter. As illustrated, the SVs 140 can be characterized as being visible by reference station R1, visible by reference station R2, or visible by reference stations R1 and R2.

According to some embodiments, reference station selection may be made to maximize common-view satellites between selected reference stations and a mobile device. Depending on desired functionality, reference station selection can be based on information received from the mobile device and/or reference stations regarding visible SVs 140. Using the RTK/DGNSS system 100 of FIG. 1 as an example, the mobile device 110 may send a request for RTK/DGNSS correction data to a service provider 170 for a position fix. The request may include or be accompanied by information regarding SVs 140 visible to the mobile device 110 (e.g., based on correction data obtained by the GNSS receiver of the mobile device 110). The service provider 170 may then select reference stations 120 based on SVs 140 visible to each of the reference stations 120, which may be provided to the service provider 170 by reference stations periodically (e.g., every 30 seconds, every minute, every five minutes, etc.), based on a triggering event (e.g., a determination of a change in SVs 140 that are visible), based on request by the service provider 170, etc. Additionally or alternatively, reference station selection may be based on SVs 140 visible to the mobile device and/or reference stations, as calculated based on the approximate location of the mobile device, known locations of the reference stations, and calculated or known current positions of the SVs 140.

In the example illustrated in FIG. 4, if the skyplot 400 illustrates the SVs 140 visible to the mobile device, reference stations R1 and R2 may be selected based on the fact that at least one of the SVs 140 visible to the mobile device is also visible to reference stations R1 and R2. In some aspects, reference stations R1 and R2 may be selected based on the fact that all of the SVs 140 visible to the mobile device are also visible to reference station R1, R2, or both.

In some embodiments, correction data from reference stations may be provided to a mobile device based on mobile device location within an area serviced by a mobile carrier network. An example of this is illustrated in FIG. 5.

Figure 5:
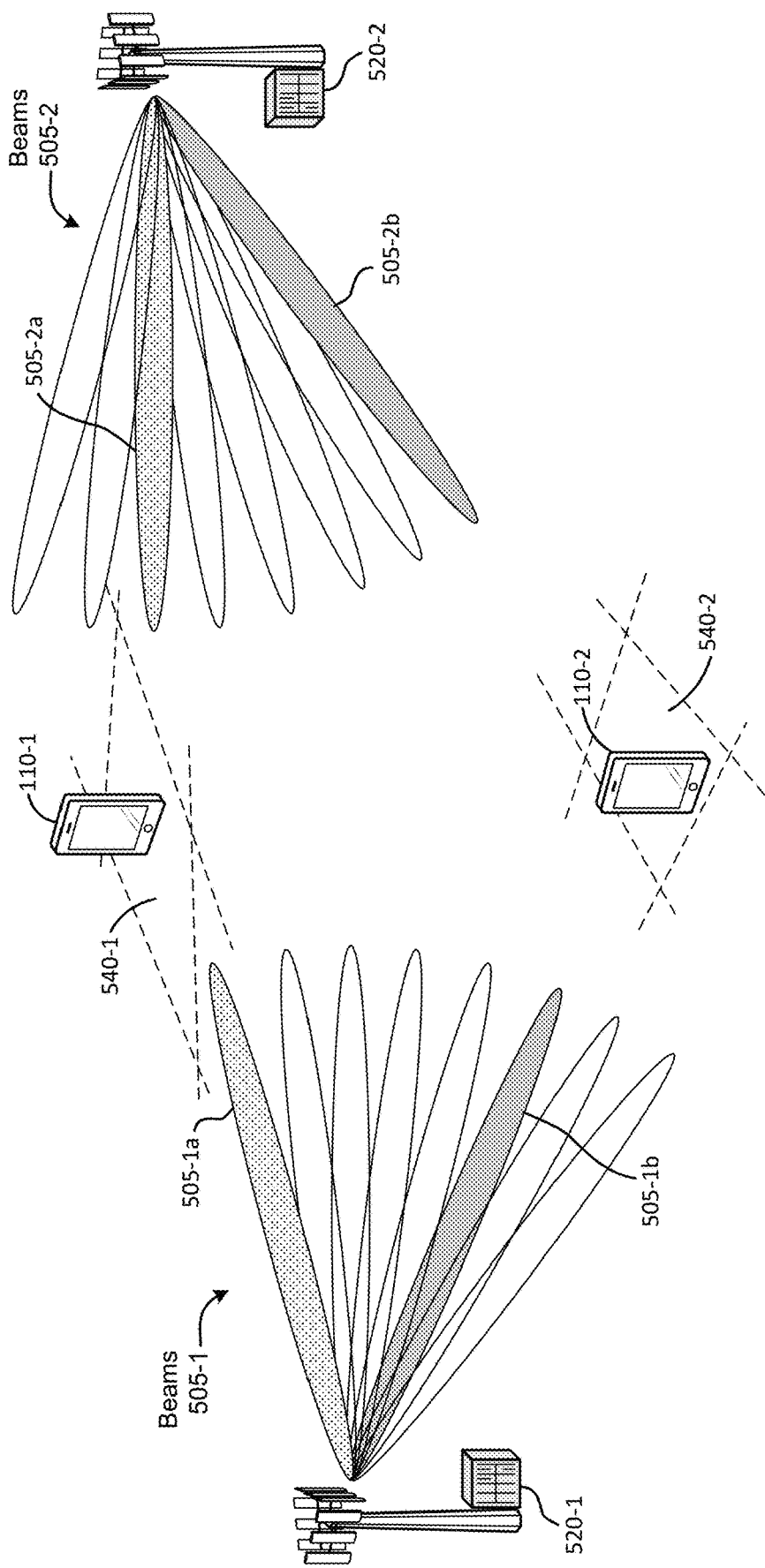
FIG. 5 is a simplified diagram illustrating how data from different reference stations may be provided to different mobile devices, based on the mobile devices' respective locations within an area serviced by a mobile carrier network, according to an embodiment.

FIG. 5 is a simplified diagram illustrating how data from different reference stations may be provided to different mobile devices 110, based on the mobile devices' respective locations within an area serviced by a mobile carrier network. Although the example illustrated in FIG. 5 illustrates how reference station selection may be based on beams 505 transmitted by cellular base stations 520, alternative embodiments may additionally or alternatively provide different reference station correction data based on other location-based criteria, such as serving cell, wireless heat map (e.g., location based on detected transmitters and (optionally) transmission strength), and the like.

The example illustrated in FIG. 5 illustrates cellular base stations 520 of a Fifth Generation New Radio (5G NR) carrier network, which are capable of transmitting RF signals in different directions using different beams 505. Cellular base stations 520 in a 5G NR network are also called Next Generation NodeBs, or gNBs. Using beams, base stations 520 are capable of communicating data specific to devices in an area serviced by a particular beam 505. According to embodiments, this can allow a mobile network to provide reference station correction data specific to areas serviced by one or more beams 505 of one or more base stations 520. In FIG. 5, a first mobile device 110-1 is located in a first area 540-1 serviced by a first beam 505-1a of a first base station 520-1 and a first beam 505-2a of a second base station 520-2. Additionally, a second mobile device 110-2 located in a second area 540-2 is serviced by a second beam 505-1b of the first base station 520-1 and a second beam 505-2b of the second base station 520-2. According to some embodiments, base stations 520 may provide different reference station correction data on different beams, via broadcast or specific transmission to one or more devices in an area 540 serviced by a beam 505. Thus, each of the beams 505-1a, 505-1b, 505-2a, and 505-2b used to transmit reference station correction data may transmit reference station correction data from a different set of one or more reference stations. For example beam 505-1a may be used to transmit correction data from reference stations R1 and R2; beam 505-1b may be used to transmit correction data from reference stations R1, R3, and R4; beam 505-2a may be used to transmit correction data from reference station R5; and beam 505-2b may be used to transmit correction data from reference stations R1, R2, R4, and R5. In this way, different areas 540 serviced by the base stations 520 may receive reference station correction data from different combinations of reference stations, where the combination of reference stations for a given area 540 is known to enable accurate RTK/DGNSS position determination for mobile devices 110 in that area 540. Alternative configurations may service an area 540 using a different number of base stations 520, including a single base station or more than two base stations.

The determination of which reference stations correction data to use for a particular beam 505 (or, more generally, a particular area 540 serviced by the mobile carrier network) may be made by a server at the base station, a location server within the network (e.g., a Location Management Function (LMF) in a 5G NR network), and/or other computer server communicatively coupled with the base stations 520. The server can receive feedback from mobile devices 110, input from external sources (e.g., network operators), data from reference stations, and/or similar inputs and employ machine learning and/or other algorithms to determine the effectiveness of different reference station correction data in different areas 540 serviced by the mobile carrier network.

Figure 6:
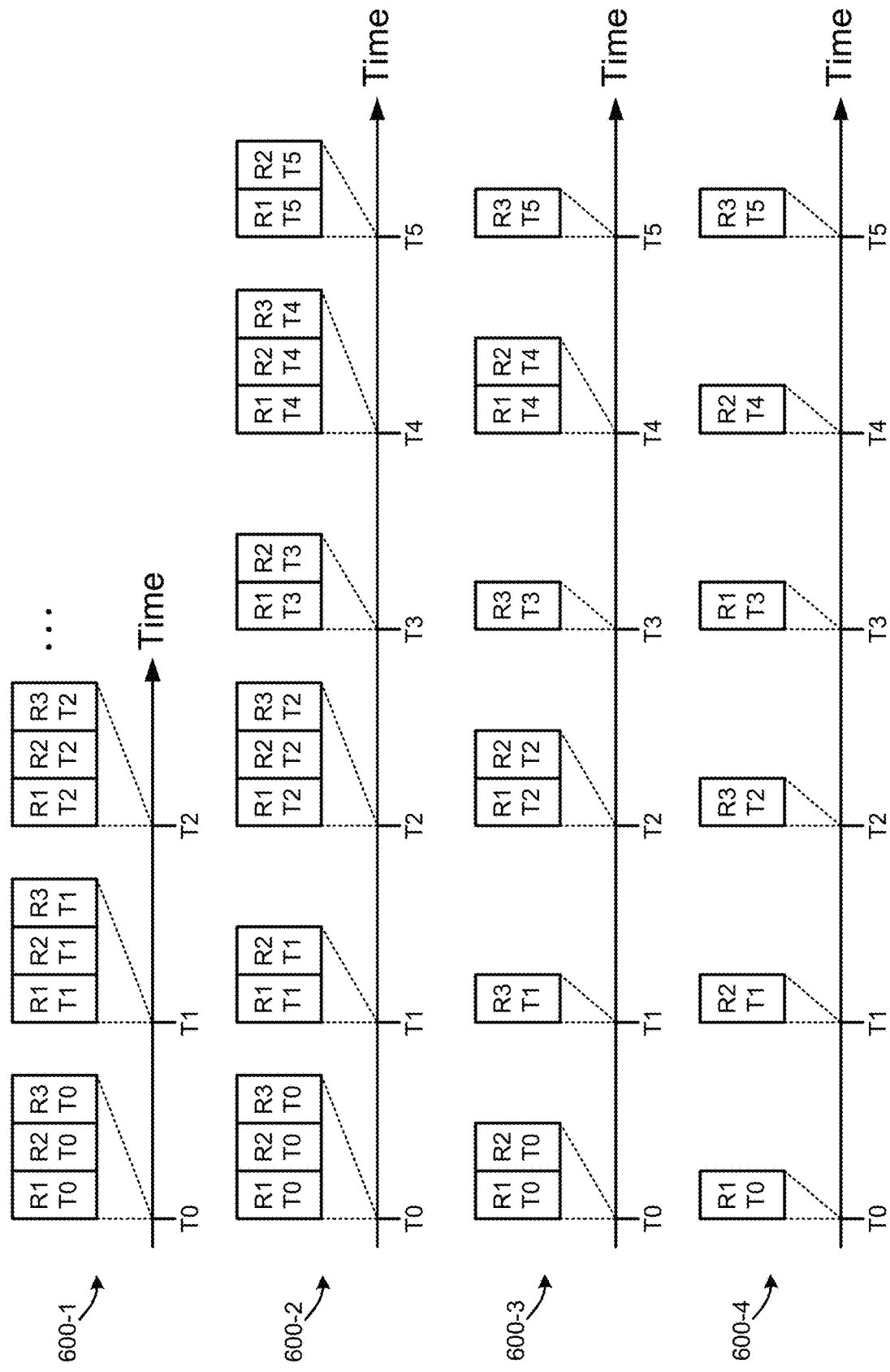
FIG. 6 is a timing diagram of different scheduling methods, according to an embodiment.

Once the reference stations 120 are selected or identified (e.g., using one or more of the previously-described techniques), the way in which corresponding reference correction data from these reference stations 120 is provided to a mobile device 110 may vary. This may depend on any of a variety of factors, including available bandwidth, performance requirements, desired functionality, and/or other factors. FIG. 6 and the following description provide ways in which correction data from reference stations 120 may be provided to a device 110, according to some embodiments.

FIG. 6 is an illustration of how different scheduling methods may be employed to provide reference station correction data to a mobile device 110 based on bandwidth or performance requirements, according to some embodiments. It will be understood that, as with other figures herein, the examples provided in FIG. 6 are non-limiting. Embodiments may use additional or alternative scheduling methods, depending on desired functionality. Here, correction data is represented by different blocks, where blocks R1, R2, and R3 represent correction data from a first, second, and third reference station 120, respectively. Time is denoted as T0, T1, T2, etc., and may represent a time at which a set of reference station correction data is transmitted. More precisely, these times may represent a time at which a server or cellular base station begins to transmit reference station correction data to a mobile device 110. It is noted that the set of reference station correction data may be transmitted by a single server or cellular base station, or subsets or the entire set of reference station correction data may be transmitted by two or more servers or cellular base stations. Subsets transmitted by different servers or cellular base stations may complement each other as described above with regard to FIG. 5. Subsets transmitted by different servers or cellular base stations may further partially or fully overlap to provide redundancy in scenarios where availability is important. Furthermore, the cellular base stations may be at least in part be provided separate from the reference stations. In certain aspects, some or all of the cellular base stations may be co-located with the respective reference stations or be provided by the respective reference stations.

The first scheduling method 600-1 utilizes a maximum bandwidth to provide reference station correction data from all reference stations (R1, R2, and R3) at every time interval (T0, T1, and T2). The second scheduling method 600-2 utilizes a slightly lower bandwidth, providing reference station correction data from two reference stations (R1 and R2) every time interval, and providing reference station correction data from the third reference station (R3) every other time interval. The third scheduling method 600-3 utilizes an even lower bandwidth by switching between providing reference station correction data from two reference stations (R1 and R2) and reference station correction data from the third reference station (R3) at every other interval. Finally, the fourth scheduling method 600-4 utilizes a minimum rate, in which reference station correction data from a single reference station is provided at each time interval, rotating from one reference station to the next at each time interval. As a person of ordinary skill in the art will appreciate, different scheduling methods may be used for different numbers of reference stations, to accommodate different bandwidth or performance requirements, or the like.

In general, an increased amount of reference station correction data may result in higher performance. Thus, because the amount of data provided to a mobile device 110 decreases from method 600-1 to method 600-4, so too may the corresponding performance. Method 600-4, for example, may result in a less-accurate position determination than method 600-1. However, method 600-4 uses much less bandwidth than method 600-1. Thus, according to desired functionality, a scheduling method may be selected based on a desired (or required) balance of performance and available bandwidth.

As noted, the reference station correction data for a given reference station 120 can include highly-accurate GNSS measurements of one or more satellites taken by the reference station 120. The mobile device 110 can then use this information, along with position information regarding the reference station 120, to perform DGNSS/RTK correction of GNSS measurements taken by the mobile device 110 in the manner previously described, resulting in a highly-accurate position determination for the mobile device 110. In some embodiments, correction data may include position information for the reference station 120 may be included in or accounted for the correction data sent to the mobile device 110 (e.g., in the blocks illustrated in FIG. 6). Alternatively, position information may be provided separately. According to some embodiments, a mobile device 110 may maintain a database or almanac of reference station position information, which may be provided by a service provider 170. The way in which the mobile device 110 may use the reference station correction data to improve the performance of a position determination may vary, depending on desired functionality.

According to a first option, for example, the mobile device 110 may use the geometry of reference stations to estimate a spatial distribution of DGNSS/RTK corrections. In this manner, the mobile device 110 can interpolate a DGNSS/RTK correction at a given position, similar to techniques performed by a service provider 170 in traditional network-based DGNSS/RTK positioning. However, because the mobile device 110 can perform GNSS-based positioning to determine its location (with an accuracy on the order of a few meters), it is not reliant on an interpolation of DGNSS/RTK corrections at a predetermined location. The mobile device 110 can instead determine a more precise interpolation specific to its GNSS-based position. As such, the resulting interpolated DGNSS/RTK correction can be more precise, and ultimately, the corresponding high-precision position determination for the mobile device 110.

According to a second option, a mobile device 110 may execute multiple instances of a positioning engine. As previously noted, a mobile device 110 may comprise a location/position estimator, which may be implemented by one or more hardware and/or software components of the mobile device 110 (as described in more detail hereafter). According to the second option, the location/position estimator may comprise multiple instances of a positioning engine (e.g., a PPE using estimation techniques such as EKF, WLS, a hatch filter, particle filter, or the like). For each of a plurality of reference stations 120, a corresponding positioning engine can use reference station correction data for the respective reference station to resolve a baseline between the UE and the respective reference station, resulting in a plurality of baseline solutions. The mobile device 110 can then calculate a position determination from the plurality of baseline solutions.

Depending on desired functionality, the plurality of baseline solutions may be combined in different ways. For example, according to some embodiments, the baseline solutions may be combined simply using an average, such as a simple average or weighted average. According to some embodiments, baselines may be weighted according to the baseline length (e.g., shorter baselines may be given more weight than longer baselines). Additionally or alternatively, baselines may be weighted based on satellite geometry as well (e.g., a baseline determined using multiple constellations with many satellites may be given more weight than a baseline determined using a single constellation and/or fewer satellites). Alternative embodiments may employ additional or alternative techniques for combining baseline solutions.

According to a third option, a mobile device 110 may execute a single of a positioning engine to process reference station correction data from multiple reference stations 120 to derive a single solution. That is, in contrast to the second option previously described, a positioning engine of the mobile device 110 may be capable of processing multiple inputs to derive a single positioning solution. For example, a centralized Kalman filter may be used to process all the baselines and resolve ambiguities (e.g., for RTK) using reference station correction data from multiple reference stations 120. More specifically, according to some embodiments, the centralized Kalman filter can be used to estimate a position (e.g., X, Y, and Z coordinates) of a mobile device, receiver clock errors from each reference station, Inter-Satellite-Type Bias (ISTB), base station tropospheric Zenith delays, and/or other ambiguities. As a person of ordinary skill in the art will appreciate, such a centralized Kalman filter may be more difficult to implement than simply combining the output of multiple Kalman filters, as described with regard to the second option above. However, this option may be advantageous from a performance standpoint (e.g., accuracy, processing usage, etc.), depending on the up limitation.

It can be noted that the performance advantages of embodiments utilizing one or more of the above-described options for processing reference station correction data may vary. A position determination for a mobile device 110 based on reference station correction data from multiple reference stations 120 can be more accurate and/or faster than a position determination based on reference station correction data from a single reference station 120, because of the multiple constraints included in a multiple-reference method. Additionally or alternatively, the utilization of reference station correction data from multiple reference stations 120 can provide advantages with regard to availability. That is, if there is an outage at one reference station 120, embodiments can continue to provide a position determination for a mobile device 110 utilizing reference station correction data from one or more additional reference stations 120.

This is similarly applicable to sparse reference station networks. For example, in a sparse RTK/DGNSS system 100 where inter-station distance is large (e.g., 1000 km or more), there may be relatively few SVs 140 that are commonly visible to both a reference station 120 and mobile device 110. However, there may be more commonly visible SVs 140 between the mobile device 110 and multiple reference stations 120 (e.g., as previously described with regard to FIG. 4). Accordingly, where reference station correction data is received by a mobile device 110 from multiple reference stations 120, the mobile device 110 may select RTK/DGNSS correction information for commonly visible SVs 140 from different reference stations 120. Therefore, the amount of usable RTK/DGNSS correction information to the mobile device 110 that receives reference station correction data from multiple reference stations 120 can be higher than the amount of usable RTK/DGNSS correction information from any single reference station 120.

Figure 7:
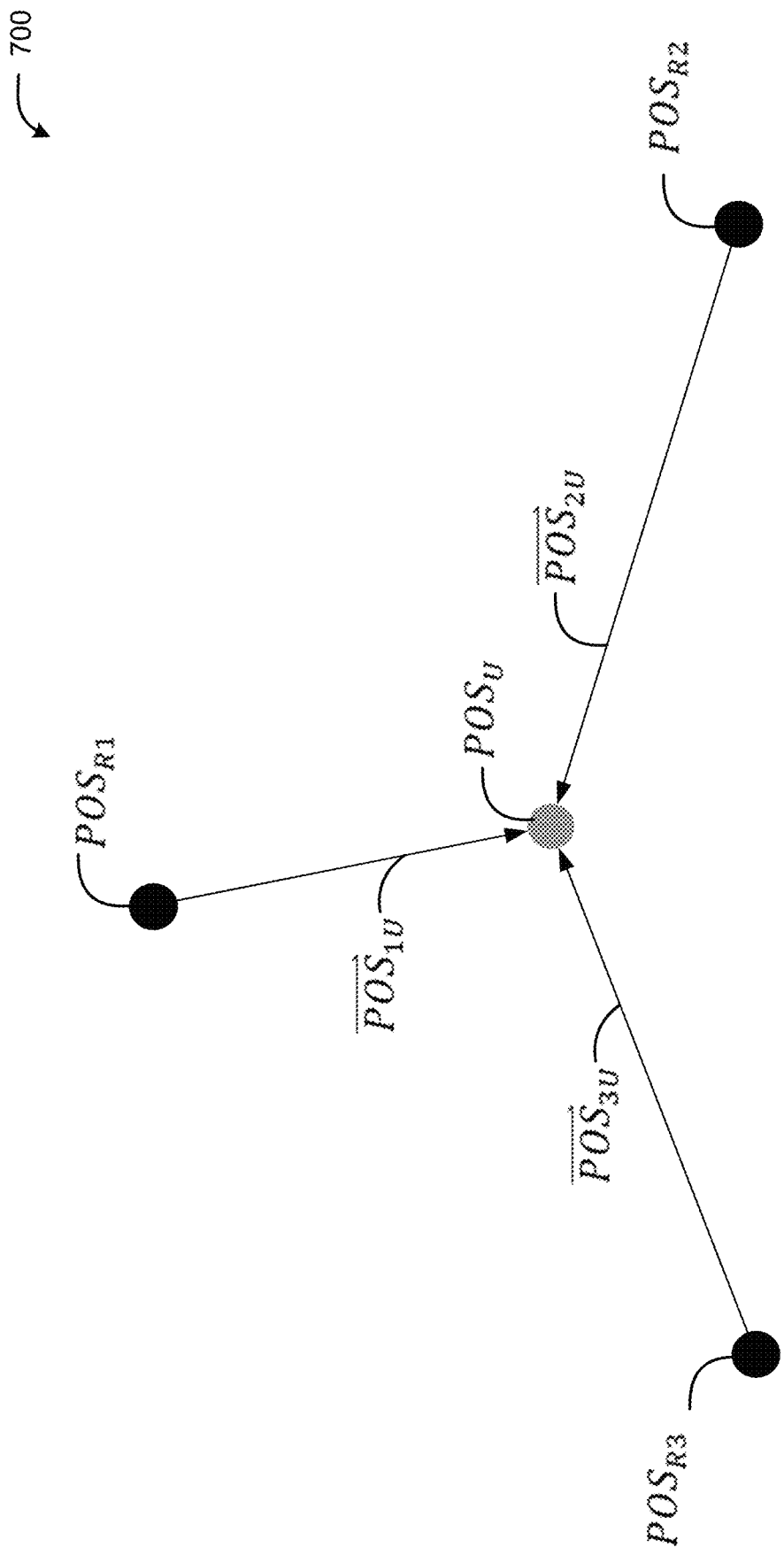
FIGS. 7 and 8 are diagrams of overhead views of a mobile device and multiple reference stations, showing values that can be derived from reference station correction data and used to perform data integrity checks, according to an embodiment.

FIG. 7 is a diagram of a simplified overhead view 700 of a mobile device and multiple reference stations, illustrating how the multiple constraints on values derived from reference station correction data from multiple reference stations can be used to provide a position determination for a mobile device, according to an embodiment. The various values in FIG. 7 are as follows: $POS_U$ represents the (exact) position of a mobile device, $POS_{R1}$ represents the (exact) position of a first reference station, $POS_{R2}$ represents the (exact) position of a second reference station, and $POS_{R3}$ represents the (exact) position of a third reference station. $\overrightarrow{POS}_{1U}$ is the position vector from the first reference station to the mobile device, $\overrightarrow{POS}_{2U}$ is the position vector from the second reference station to the mobile device, and $\overrightarrow{POS}_{3U}$ is the position vector from the third reference station to the mobile device. As with other figures provided herein, FIG. 7 is provided as a non-limiting illustrative example. Characteristics such as the number of reference stations, their relative position to each other and the mobile device, and the like, may vary from situation to situation.

As noted, the values illustrated in FIG. 7 may be derived from known positions of reference stations, along with reference station correction data from the reference stations. Constraints on these values can be used to provide checks of the reliability and integrity of the reference station correction data. Moreover, these constraints may further allow for the determination of a mobile device position ($POS_U$) more quickly. Some constraints may be represented by the following equations:

$$POS_{R1} + \overrightarrow{POS}_{1U} = POS_{R2} + \overrightarrow{POS}_{2U} = POS_{R3} + \overrightarrow{POS}_{3U} = POS_U, \quad (1)$$

$$\overrightarrow{POS}_{12} = \overrightarrow{POS}_{1U} + \overrightarrow{POS}_{U2}, \text{ and} \quad (2)$$

$$\Delta\nabla Amb_{12} = \Delta\nabla Amb_{1U} + \Delta\nabla Amb_{U2}. \quad (3)$$

Equation (1) is a position vector consistency check using the known positions of the reference stations and the vectors from the reference stations to the mobile device. The position of a reference station plus the vector to the mobile device should equal the position of the mobile device. This should be the same for all reference stations. If reference station correction data for a reference station does not match that of other reference stations, it may be disregarded. More specifically, $\overrightarrow{POS}_{1U}$, $\overrightarrow{POS}_{2U}$, and $\overrightarrow{POS}_{3U}$ may represent the respective baseline solutions as described above. Based on the position vector consistency check, one or more baseline solutions may be eliminated from the further processing, e.g., based on deviating from the determined mobile device position by more than a threshold or more than the other baseline solutions. Additionally or alternatively, voting logic or de-weighting as described below may be applied.

Figure 8:
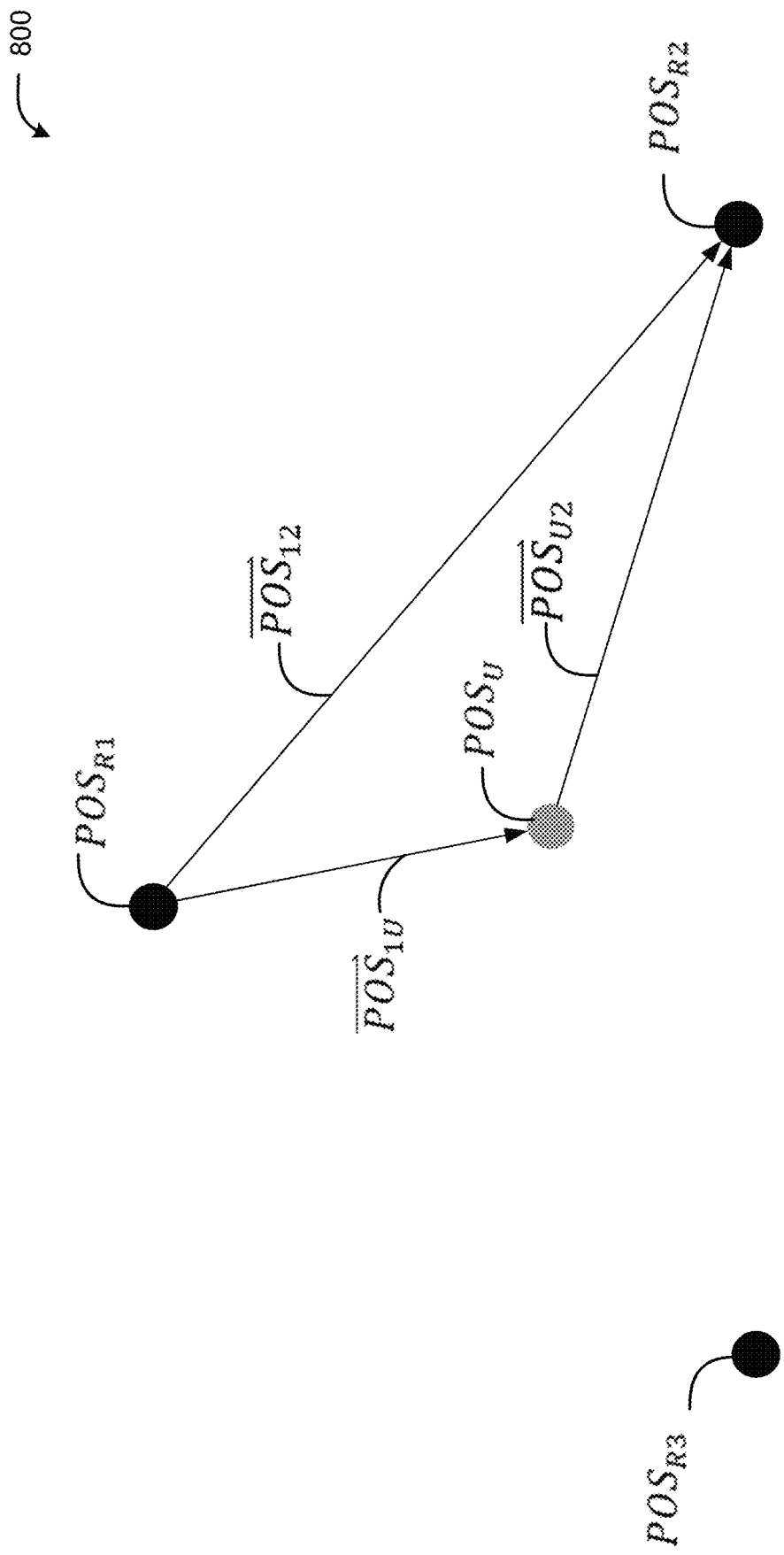

Equation (2) is a position vector constraint that arises from the relative relationship between the positions of the mobile device, first reference station, and second reference station. As illustrated in FIG. 8, the position vector ($\overrightarrow{POS}_{12}$) between the first reference station and second reference station (which can be derived from known positions of the first and second reference station) is equal to the position vector ($\overrightarrow{POS}_{1U}$) from the first reference station to the mobile device plus the position vector ($\overrightarrow{POS}_{U2}$) from the mobile device to the second reference station. As will be understood, similar constraints may be derived from the relationship between (i) the mobile device, second reference station, and third reference station, and (ii) the mobile device, third reference station, and first reference station. Again, where data from one reference station does not match data from others, it may be disregarded. Elimination of data from one or even both reference stations from the further processing may again be based on how much the respective baseline solutions deviate from the determined mobile device position ($POS_U$) and/or how much the left- and right-hand sides of Equation (2) differ, e.g., by comparing a norm of the difference with a maximum allowed deviation. Additionally or alternatively, de-weighting as described below may be used.

Equation (3) is a carrier phase ambiguity check, that can be used in RTK implementations. Similar, in ways, to equation (2), the carrier phase ambiguity ($\Delta\nabla Amb_{12}$) for the baseline between the first reference station and second reference station is equal to the carrier phase ambiguity ($\Delta\nabla Amb_{1U}$) between first reference station and the mobile device plus the carrier phase ambiguity ($\Delta\nabla Amb_{U2}$) between the mobile device to the second reference station Again, similar constraints may be derived using baselines between (i) the mobile device, second reference station, and third reference station, and (ii) the mobile device, third reference station, and first reference station. Again, where data from one reference station does not match data from others, it may be disregarded. Corresponding criteria for eliminating data from one or both reference stations from the further processing may be applied on the basis of the carrier phase ambiguities. Additionally or alternatively, de-weighting as described below may be applied.

Equations (1), (2), and/or (3) can be used as data integrity checks to determine whether reference station correction data is good. As noted, reference station correction data from a reference station may be disregarded if it fails any or all of these checks. Voting logic using three or more reference stations, for example, can be used to identify and disregard information from a nonconforming reference station.

Additionally or alternatively, such as in cases where reference station data from only two reference stations is available, equations (1), (2), and/or (3) can be used to determine whether a position determination based on reference station correction data is good. If, for example, errors are detected using equations (1), (2), and/or (3), the position determination may be determined to be unreliable, and the position determination may then be disregarded or de-weighted accordingly.

Figure 9A:
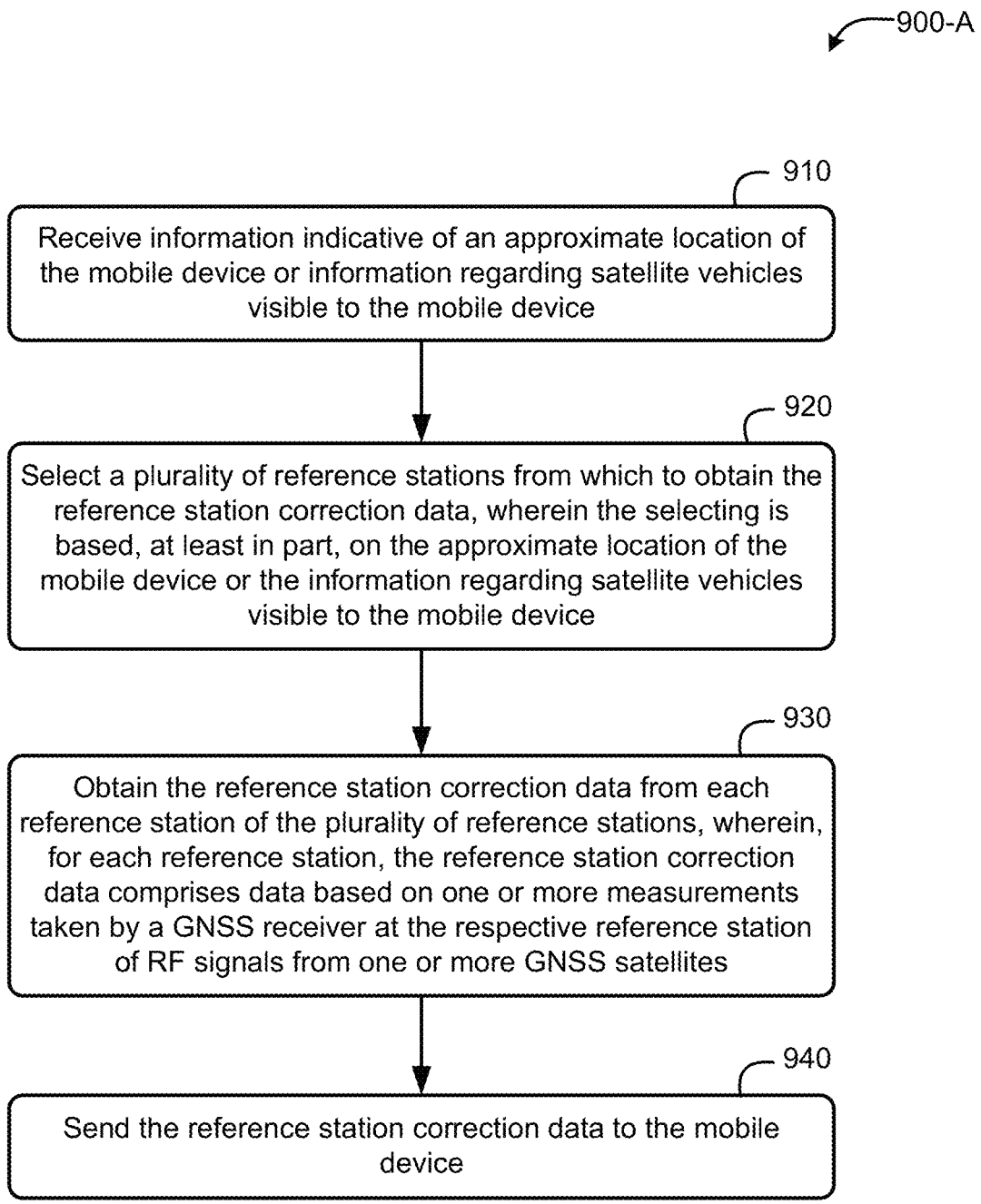
FIGS. 9A and 9B are flow diagrams of methods of providing reference station correction data to a mobile device for RTK or DGNSS corrections, according to various embodiments.

FIG. 9A is a flow diagram of a method 900-A of providing reference station correction data to a mobile device for RTK or DGNSS corrections, according to an embodiment. The method 900-A can utilize the techniques described above, and therefore may be seen as an implementation of the previously-described processes, including those illustrated in FIGS. 2-5. Alternative embodiments may vary in function by combining, separating, or otherwise varying the functionality described in the blocks illustrated in FIG. 9A. Means for performing the functionality of one or more of the blocks illustrated in FIG. 9A may comprise hardware and/or software components of a computer system, such as the components shown in FIG. 12 and described herein below. The computer system may comprise a computer server corresponding to the service provider 170 illustrated in FIG. 1 and described in the embodiments above.

At block 910, the functionality comprises receiving information indicative of an approximate location of the mobile device or information regarding satellite vehicles visible to the mobile device. As noted in the above-described embodiments, the approximate location of the mobile device may be determined in any of a variety of ways, such as previously-determined GNSS-based position fix (e.g., GNSS, RTK, or DGNSS), sensor-based positioning (e.g., dead reckoning, image-based positioning, etc.), and/or network-based positioning techniques (which may use RF signals to perform multilateration and/or multiangulation of the mobile device to determine the mobile devices location, based on known positions of RF transceivers). Network-based positioning techniques can include, for example, multi-Round Trip Time (RTT), Observed Time Difference Of Arrival (OTDOA) or Downlink Time Difference Of Arrival (DL-TDOA), angle of arrival (AOA), angle of departure (AOD), and/or other positioning procedures, which may be performed, for example, in a cellular or Wireless Local Area Network (WLAN). Information regarding satellite vehicles visible may be obtained by the mobile device itself. The approximate location of the mobile device or information regarding satellite vehicles visible to the mobile device may be provided by the mobile device itself (e.g., via a data communication network 150, such as a cellular network and/or the Internet), or by another entity. In some embodiments, for example, a mobile network may be able to provide the approximate location of the mobile device.

Figure 12:
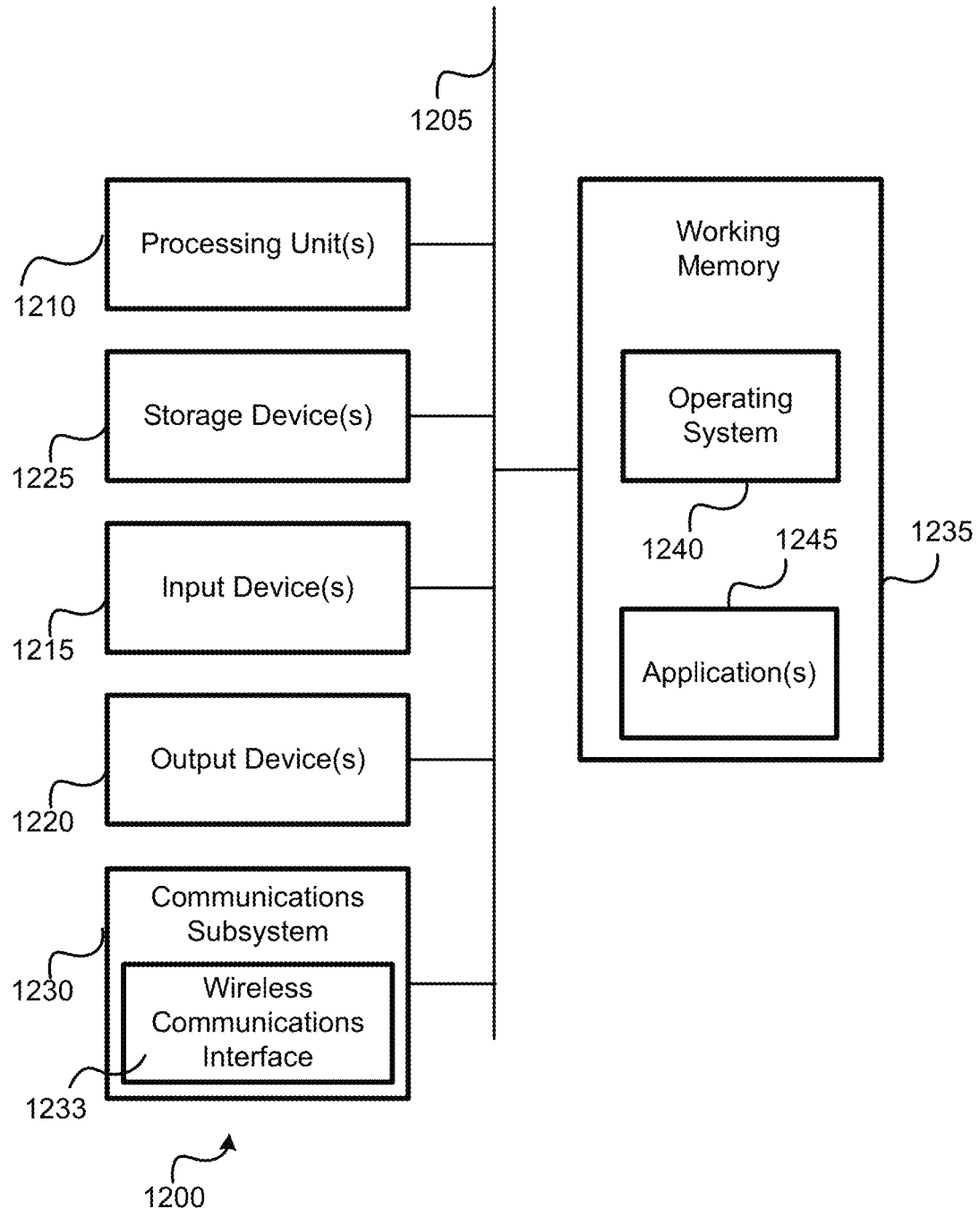
FIG. 12 is a block diagram of an embodiment of a computer system.

Means for performing the functionality at block 910 may include one or more software and/or hardware components of a computer system 1200, such as a bus 1205, processing unit(s) 1210, communications subsystem 1230, working memory 1235, and/or other software and/or hardware components of a computer system 1200 as illustrated in FIG. 12 and described in more detail below.

At block 920, the functionality comprises selecting a plurality of reference stations from which to obtain the reference station correction data, wherein the selecting is based, at least in part, on the approximate location of the mobile device. As previously discussed in reference to FIGS. 2-5, reference stations may be selected using different techniques. For example, the reference stations may be selected to maximize a number of common-view GNSS satellites between the mobile device and the plurality of reference stations. This "balanced" approach may be particularly useful in cases where distance between reference stations is large (e.g., hundreds of kilometers or more), and different reference stations may have different common-view satellites with the mobile device. According to some embodiments, to maximize the number of common-view GNSS satellites between the mobile device and the plurality of reference stations, the method may further comprise obtaining information from each reference station of the plurality of reference stations of GNSS satellites viewable by the respective reference station, or obtaining information from the mobile device indicative of GNSS satellites viewable by the mobile device, or both.

According to some embodiments, selecting the plurality of reference stations may be additionally or alternatively based on a respective location of each reference station of the plurality of reference stations. In such embodiments, selecting the plurality of reference stations may be based on a proximity of the respective location of each reference station of the plurality of reference stations to the approximate location of the mobile device. The radius-based selection illustrated in FIG. 2, for example, is a form of this type of reference station selection. In some embodiments, the reference stations may be selected to minimize a distance between the midpoint or centroid of the reference station locations and the approximate location of the mobile device. The process illustrated in FIG. 3, for example, is a form of this type of reference station selection.

Means for performing the functionality at block 920 may include one or more software and/or hardware components of a computer system 1200, such as a bus 1205, processing unit(s) 1210, working memory 1235, and/or other software and/or hardware components of a computer system 1200 as illustrated in FIG. 12 and described in more detail below.

At block 930, the functionality comprises gaining the reference station correction data from each reference station of the plurality of reference stations, wherein, for each reference station, the reference station correction data comprises data based on one or more measurements taken by a GNSS receiver at the respective reference station of RF signals from one or more GNSS satellites. As a person of ordinary skill in the art will appreciate, this reference station correction data can be used by a mobile device to perform RTK or DGNSS corrections on measurements of the GNSS satellites taken by the mobile device. As noted, the correction data may include corrective information based on measurement data and the known location of the respective reference station. Additionally or alternatively, the correction data may include the measurement data itself, and (optionally) location information for the respective reference station. To enable the mobile device to determine its position, the reference station correction data for a given reference station may include or be accompanied by timing information regarding when the one or more measurements of RF signals from the one or more GNSS satellites were taken by the reference station, position information regarding the position of the reference station, etc.

Means for performing the functionality at block 930 may include one or more software and/or hardware components of a computer system 1200, such as a bus 1205, processing unit(s) 1210, communications subsystem 1230, working memory 1235, and/or other software and/or hardware components of a computer system 1200 as illustrated in FIG. 12 and described in more detail below.

At block 940, the functionality comprises sending the reference station correction data to the mobile device. As previously noted, a computer server (e.g., service provider 170) may be communicatively coupled with a mobile device 110 via a data communication network 150. The data communication network 150 may comprise any of a variety of public and/or private networks, including the Internet, a mobile communication network, and/or the like. In some embodiments, therefore, sending the reference station correction data to the mobile device may comprise transmitting the reference station correction data from one or more mobile network base stations. As previously described in reference to FIG. 5, different mobile devices in different locations within different coverage areas (e.g., areas 540) of one or more mobile network base stations may be provided with different selections of reference stations. Thus, according to some embodiments in which the approximate location of the mobile device is in a first coverage area of the one or more mobile network base stations, the method 900-A may further comprise sending correction data from a different plurality of reference stations to a second mobile device in a second coverage area of the one or more mobile network base stations.

Means for performing the functionality at block 940 may include one or more software and/or hardware components of a computer system 1200, such as a bus 1205, processing unit(s) 1210, communications subsystem 1230, working memory 1235, and/or other software and/or hardware components of a computer system 1200 as illustrated in FIG. 12 and described in more detail below.

Figure 9B:
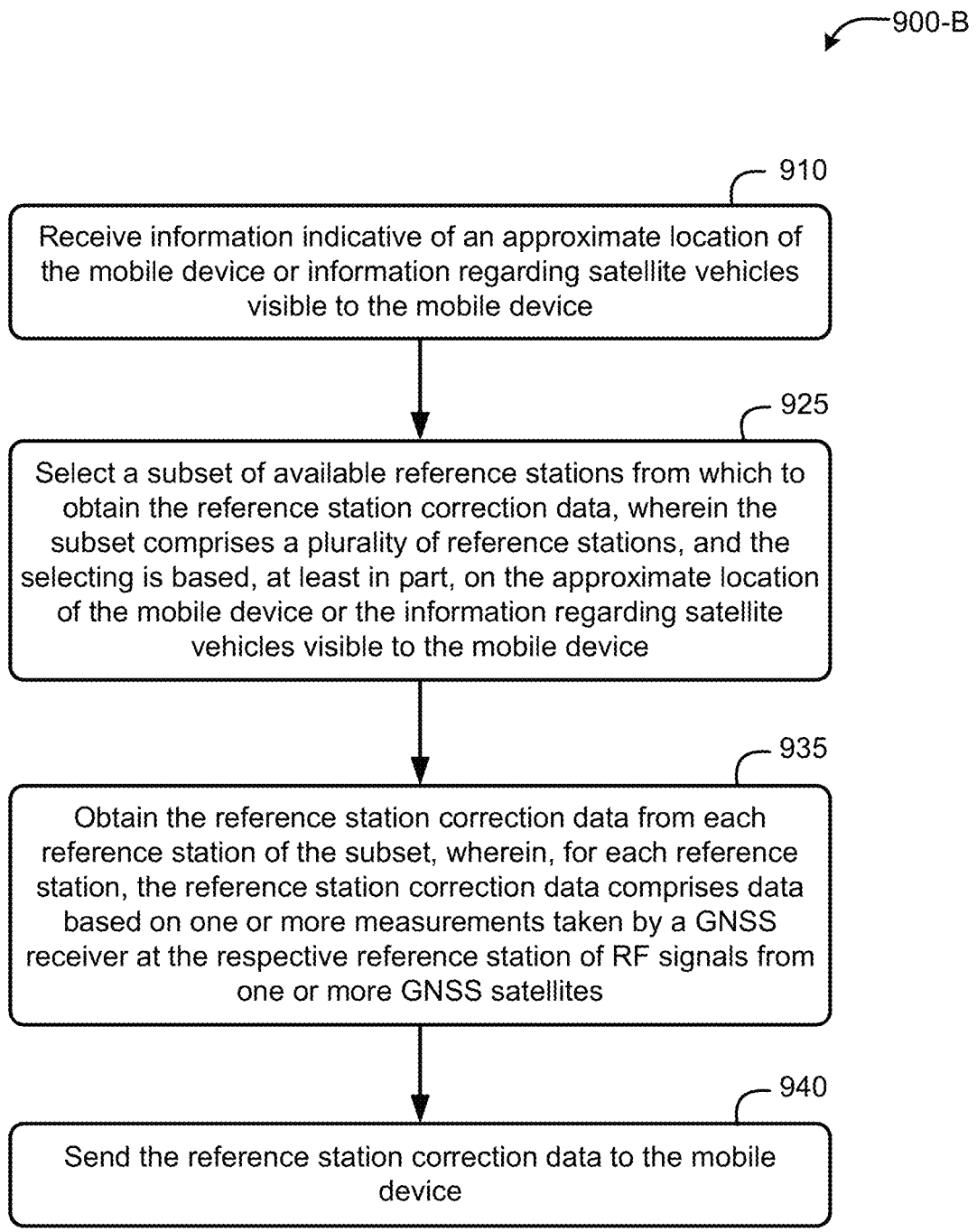

FIG. 9B is a flow diagram of a method 900-B of providing reference station correction data to a mobile device for RTK or DGNSS corrections, according to another embodiment. The functionality in the blocks of FIG. 9B is similar to corresponding blocks in FIG. 9A. In FIG. 9B, however, the functionality of block 925 explicitly refers to the selected reference stations as a "subset of available reference stations from which to obtain the reference station correction data," and this subset is later referred to in block 935. Similar to the method 900-A of FIG. 9A, can utilize the techniques described above. In particular, the selection of the subset may include one or more of the previously-described processes illustrated in FIGS. 2-5. Alternative embodiments may vary in function by combining, separating, or otherwise varying the functionality described in the blocks illustrated in FIG. 9B. Means for performing the functionality of one or more of the blocks illustrated in FIG. 9B may comprise hardware and/or software components of a computer system, such as the components shown in FIG. 12 and described herein below. The computer system may comprise a computer server corresponding to the service provider 170 illustrated in FIG. 1 and described in the embodiments above.

Figure 10A:
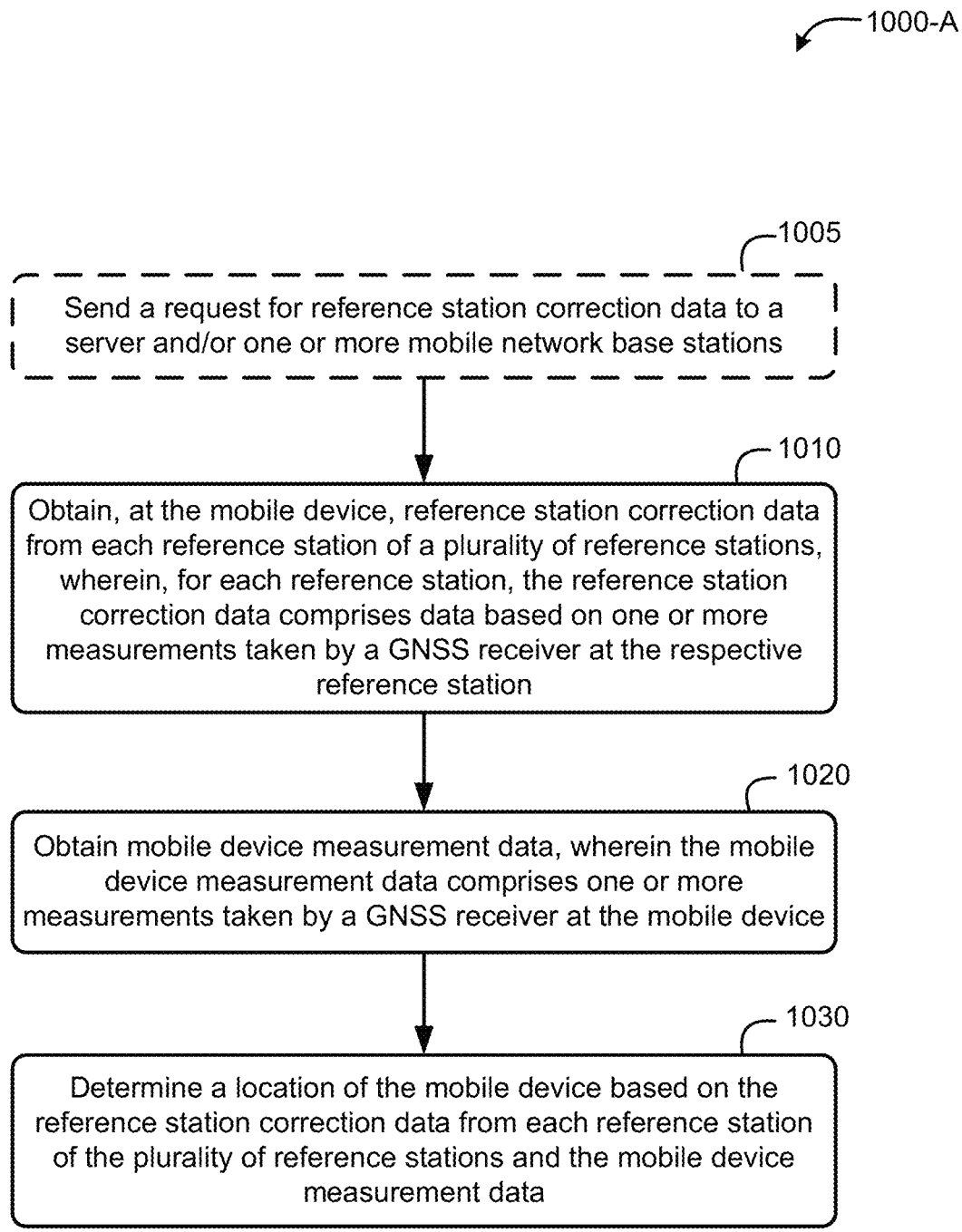
FIGS. 10A-10C are flow diagrams of methods of applying RTK or DGNSS corrections at a mobile device, according to various embodiments.

FIG. 10A is a flow diagram of a method 1000-A of applying RTK or DGNSS corrections at a mobile device, according to an embodiment. The method 1000-A can utilize the techniques described above, and therefore may be seen as an implementation of the previously-described processes, including those described in reference to FIGS. 2-7. Alternative embodiments may vary in function by combining, separating, or otherwise varying the functionality described in the blocks illustrated in FIG. 10A. Means for performing the functionality of one or more of the blocks illustrated in FIG. 10A may comprise hardware and/or software components of a mobile device, such as the components shown in FIG. 11 and described herein below.

At block 1005, the functionality optionally comprises sending a request for reference station correction data to a server and/or one or more mobile network base stations. As previously noted, a mobile device can send a request to a DGNSS/RTK service provider for DGNSS/RTK correction data. The request may include approximate location of the mobile device (e.g., based on a previously-known position, non-GNSS-based positioning, etc.), and may also include an indication of the mobile device's capabilities for interpolating correction data. According to some embodiments, the request may additionally or alternatively comprise and/or a QOS indicator and/or a requested number N of reference stations. Means for performing the functionality at block 1005 may include one or more software and/or hardware components of a computer system 1100, such as a bus 1105, processing unit(s) 1110, wireless communication interface 1130, memory 1160, and/or other software and/or hardware components of a mobile device 110 as illustrated in FIG. 11 and described in more detail below.

At block 1010, the functionality comprises obtaining, at the mobile device, reference station correction data from each reference station of a plurality of reference stations, wherein, for each reference station, the reference station correction data comprises data based on one or more measurements taken by a GNSS receiver at the respective reference station of RF signals from one or more GNSS satellites. The reference station correction data from each reference station of the plurality of reference stations is limited to correction data associated with or obtained at the respective reference station. According to embodiments of the present disclosure, the reference station correction data does not include reference station correction data of any other of the plurality of reference stations. As noted, the correction data may include corrective information based on measurement data and the known location of the respective reference station. Additionally or alternatively, the correction data may include the measurement data itself, and (optionally) location information for the respective reference station. As previously described, the reference station correction data may be obtained from a computer server and/or one or more mobile network base stations. According to some embodiments, obtaining the reference station correction data from a computer server may comprise initiating a communication session between the mobile device and the computer server.

Figure 11:
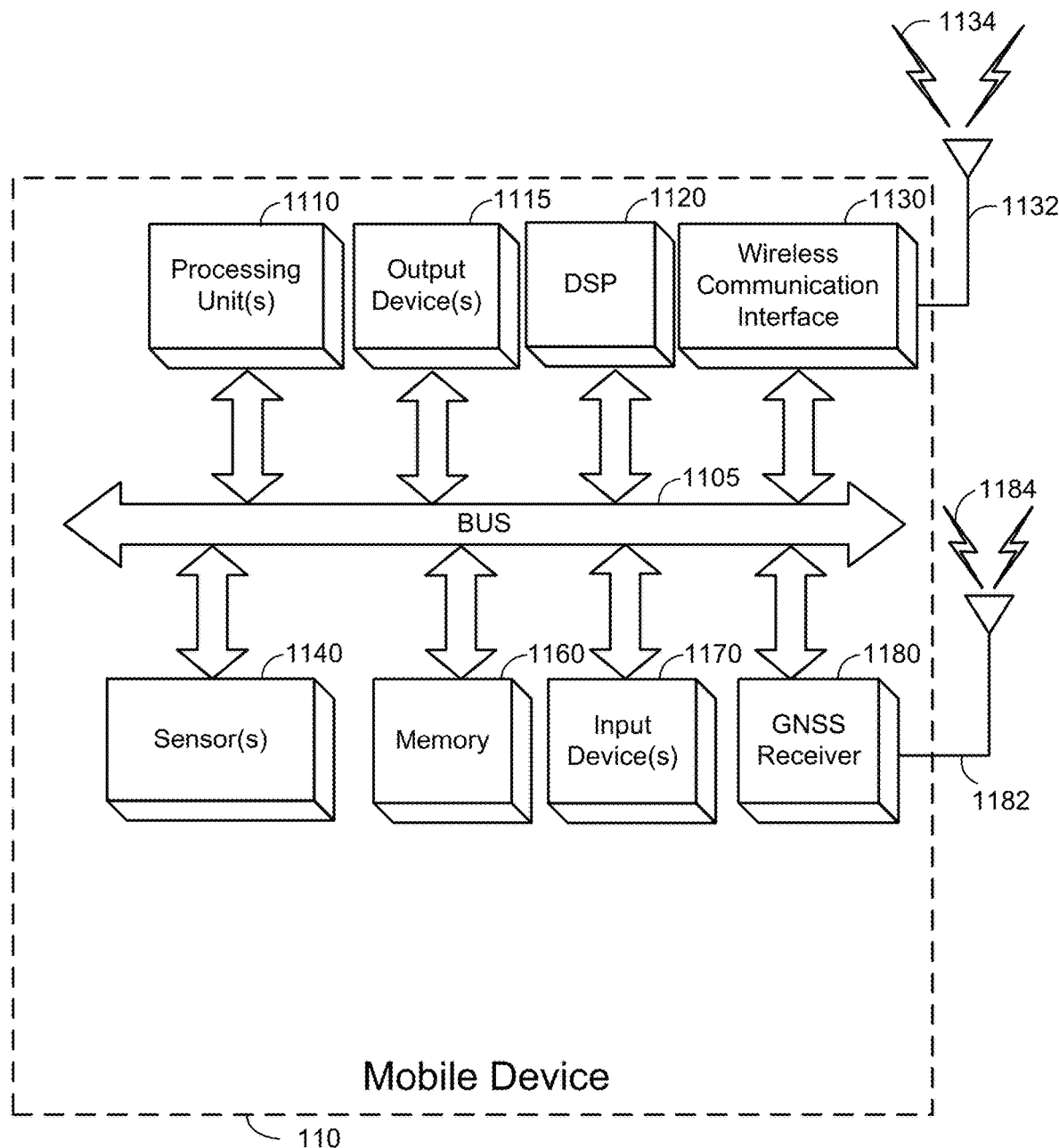
FIG. 11 is a block diagram of a mobile device, according to an embodiment.

Means for performing the functionality at block 1010 may include one or more software and/or hardware components of a computer system 1100, such as a bus 1105, processing unit(s) 1110, wireless communication interface 1130, memory 1160, and/or other software and/or hardware components of a mobile device 110 as illustrated in FIG. 11 and described in more detail below.

At block 1020, the functionality comprises obtaining mobile device measurement data, wherein the mobile device measurement data comprises one or more measurements taken by a GNSS receiver at the mobile device of RF signals from the one or more GNSS satellites. As a person of ordinary skill in the art will appreciate, the mobile device can use the reference station correction data obtained at block 1010 to perform RTK or DGNSS corrections on the mobile device measurement data, to allow the mobile device to make a high-accuracy position determination.

Means for performing the functionality at block 1020 may include one or more software and/or hardware components of a computer system 1100, such as a bus 1105, processing unit(s) 1110, GNSS receiver 1180, memory 1160, and/or other software and/or hardware components of a mobile device 110 as illustrated in FIG. 11 and described in more detail below.

At block 1030, the functionality comprises determining a location of the mobile device based on the reference station correction data from each of a plurality of reference stations and the mobile device measurement data. As previously described, a mobile device can use reference station correction data without the need for interpolated RTK/DGNSS correction information, as used in traditional RTK/DGNSS systems. The position determination can instead be made by, for example, combining position determinations made from reference station correction data of different reference stations, or using a single Kalman filter to process the reference station correction data from the plurality of reference stations. Thus, according to some embodiments of the method 1000-A, determining the location of the mobile device at block 1030 may comprise, for each reference station of the plurality of reference stations, determining an estimated location of the mobile device based on the reference station correction data from the respective reference station and the mobile device measurement data, and combining all of the estimated locations to determine the location of the mobile device. Moreover, according to some embodiments, combining all the estimated locations may comprise taking a simple average or weighted average of the estimated locations. Alternatively, according to some embodiments, determining the location of the mobile device comprises using a single Kalman filter to process the reference station correction data from all reference stations of the plurality of reference stations.

Means for performing the functionality at block 1030 may include one or more software and/or hardware components of a computer system 1100, such as a bus 1105, processing unit(s) 1110, memory 1160, and/or other software and/or hardware components of a mobile device 110 as illustrated in FIG. 11 and described in more detail below.

As previously described with regard to Equations (1)-(3), checks may be performed on the estimated mobile device position and/or other values determined from the reference station correction data to determine whether the reference station correction data and/or estimated mobile device position, is accurate. Thus, some embodiments of the method 1000-A may further comprise verifying the accuracy of the determined location of the mobile device using a carrier phase integer ambiguity or position vector from at least two of the plurality of reference stations.

Some embodiments may include additional or alternative features as described herein. For example, some embodiments of the method 1000-A may include disregarding the reference station correction data from one or more reference stations of the plurality of reference stations based on the verifying of the accuracy of the determined location of the mobile device, and determining a refined location of the mobile device based on remaining reference station correction data from the plurality of reference stations and the mobile device measurement data.

Additionally or alternatively, as noted, the method 1000-A may comprise sending a request for the reference station correction data to a provider service. According to some embodiments, the request includes information indicative of an approximate location of the mobile device. Additionally or alternatively, the request includes at least one of a quality of service (QOS) or a number of reference stations to be included in the plurality of reference stations.

According to some embodiments, the method 1000-A may further comprise obtaining reference station correction data from each reference station of a plurality of reference stations comprises receiving the reference station correction data from one or more mobile network base stations. Receiving the reference station correction data from one or more mobile network base stations may further comprise repeatedly receiving the reference station correction data from the one or more mobile network base stations. According to some embodiments, a repetition rate of receiving the reference station correction data may be based on at least one of a bandwidth of a wireless communication with the one or more mobile network base stations or a performance requirement for the determination of the location of the mobile device.

Figure 10B:
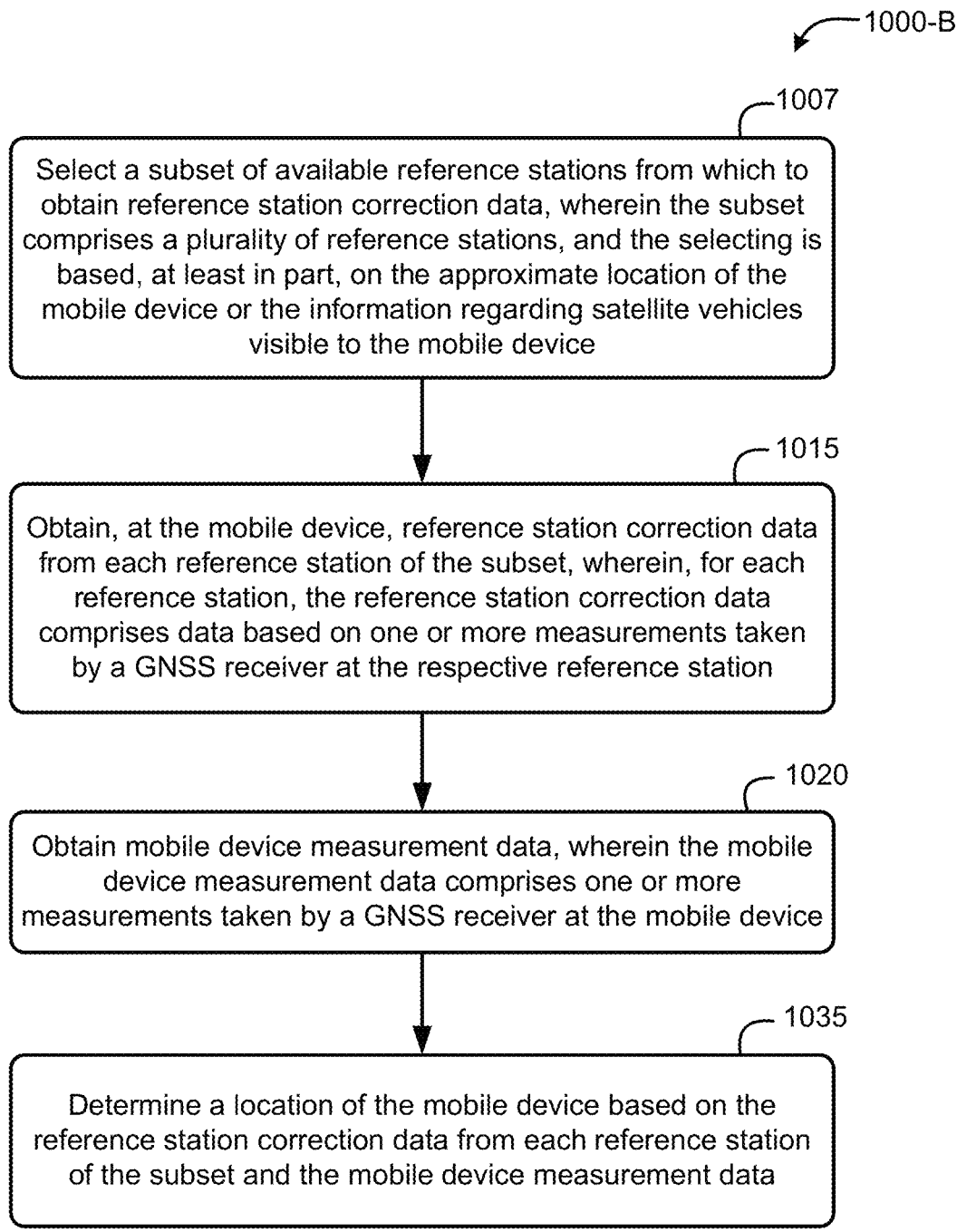

FIG. 10B is a flow diagram of a method 1000-B of applying RTK or DGNSS corrections at a mobile device, according to another embodiment. As with the method 1000-A of FIG. 10A, method 1000-B can utilize the techniques described above, and therefore may be seen as an implementation of the previously-described processes, including those described in reference to FIGS. 6-7. Further, the functionality in the blocks of FIG. 10B is similar to corresponding blocks in FIG. 10A. The primary difference of FIG. 10B is the functionality at block 1007, which includes the explicit selection of a subset of available reference stations from which to obtain reference station correction data, which can be performed by the mobile device itself. That is, according to some embodiments, reference station locations and (optionally) other information for reference station selection (e.g., using the selection techniques shown in FIGS. 2-5 and described above) can be provided to a mobile device, enabling the mobile device to perform reference station selection. The information for reference station selection may be obtained by the mobile device, for example, via broadcast and/or a data communication network 150 (e.g., the Internet and/or another data network). The functionality of blocks 1015 and 1035 in FIG. 10B echo that of respective blocks 1010 and 1030 of FIG. 10A, except blocks 1015 and 1035 explicitly refers to the selected reference stations as a "subset of available reference stations from which to obtain the reference station correction data," in a manner similar to FIG. 9B. Alternative embodiments may vary in function by combining, separating, or otherwise varying the functionality described in the blocks illustrated in FIG. 10B. Means for performing the functionality of one or more of the blocks illustrated in FIG. 10B may comprise hardware and/or software components of a mobile device, such as the components shown in FIG. 11 and described herein below.

Figure 10C:
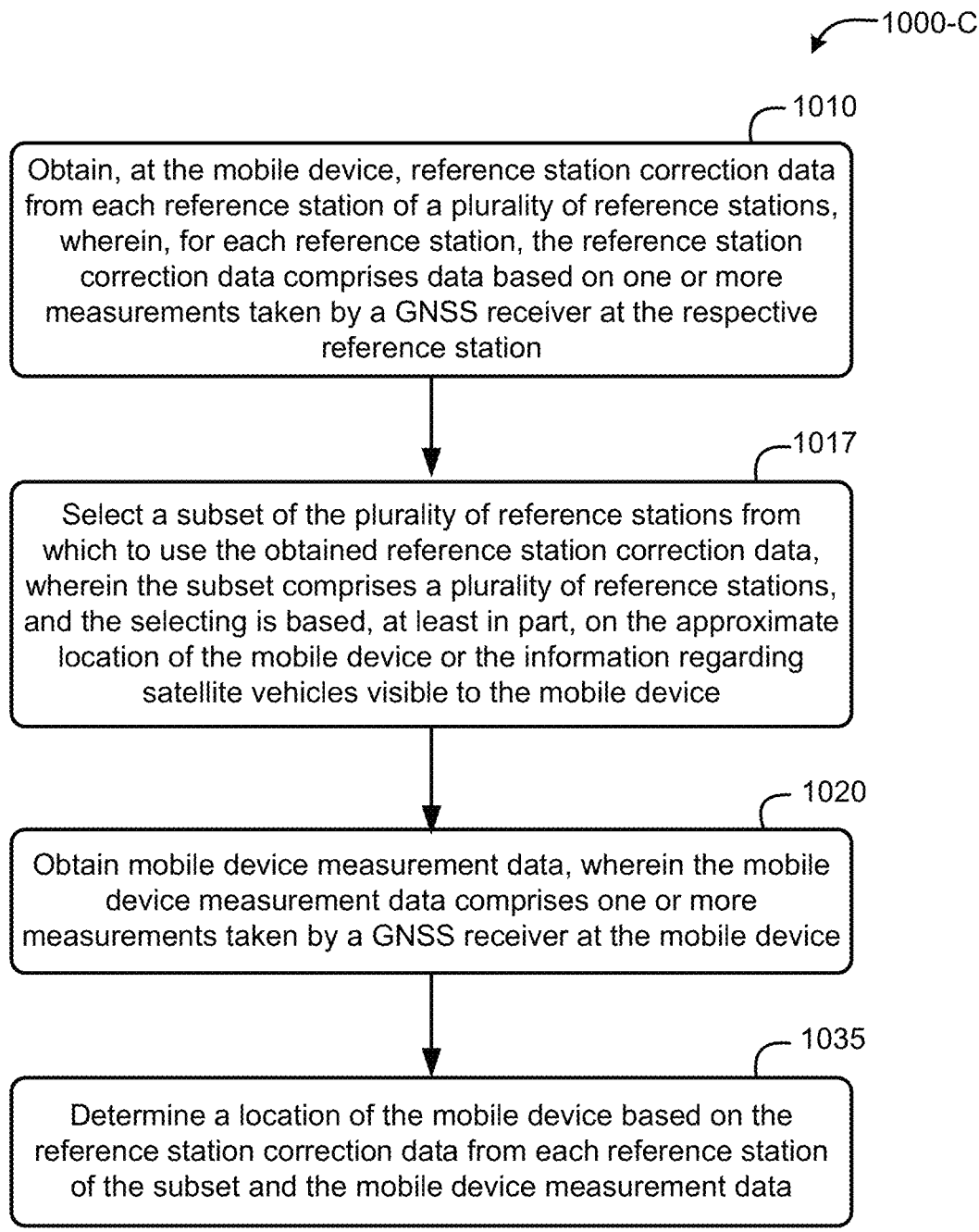

FIG. 10C is a flow diagram of a method 1000-C of applying RTK or DGNSS corrections at a mobile device, according to another embodiment. The method 1000-C comprises a further variation of the methods 1000-A and 1000-B of FIGS. 10A and 10B. Here, the functionality at block 1010 may be the same as corresponding block 1010 of FIG. 10A, comprising obtaining, at the mobile device, reference station correction data from each reference station of a plurality of reference stations, wherein, for each reference station, the reference station correction data comprises data based on one or more measurements taken by a GNSS receiver at the respective reference station of RF signals from one or more GNSS satellites. The functionality at block 1017 comprises selecting a subset of the plurality of reference stations from which to use the obtained reference station correction data, wherein the subset comprises a plurality of reference stations, and the selecting is based, at least in part, on the approximate location of the mobile device or the information regarding satellite vehicles visible to the mobile device. That is, in contrast to the functionality at block 1007 of method 1000-B, in which reference stations from which to obtain reference station correction data are selected, the functionality at block 1017 comprises a post hoc selection of reference stations from which correction data has been obtained. This may be the case, for example, in implementations where the mobile device obtains correction data via broadcast. Again, this selection may use one or more of the selection techniques shown in FIGS. 2-5 and previously described. The method 1000-C can then proceed in a manner similar to method 1000-B, where measurement data is obtained (at block 1020) and the location of the mobile device is determined (at block 1035) based on the measurement data and the reference station correction data from each reference station of the subset. Alternative embodiments may vary in function by combining, separating, or otherwise varying the functionality described in the blocks illustrated in FIG. 10C. Means for performing the functionality of one or more of the blocks illustrated in FIG. 10C may comprise hardware and/or software components of a mobile device, such as the components shown in FIG. 11 and described herein below.

FIG. 11 is a block diagram of various hardware and software components of a mobile device 110, according to an embodiment. These components can be utilized as described herein above (e.g. in association with FIGS. 1-10). For example, the mobile device 110 can perform the operations of the method illustrated in FIGS. 10A-10C, and/or one or more of the functions of a mobile device 110 as described in the embodiments herein. It should be noted that FIG. 11 is meant only to provide a generalized illustration of various components, any or all of which may be utilized as appropriate. As previously noted, mobile device 110 may vary in form and function, and may ultimately comprise any GNSS-enabled device, including vehicles, commercial and consumer electronic devices, survey equipment, and more. Thus, in some instances, components illustrated by FIG. 11 can be localized to a single physical device and/or distributed among various networked devices, which may be disposed at different physical locations (e.g., different locations of a vehicle). It can be further noted that reference stations may utilize hardware and/or software components similar to the mobile device 110 and/or computer system 1200 (described below) to provide the functionality described herein.

The mobile device 110 is shown comprising hardware elements that can be electrically coupled via a bus 1105 (or may otherwise be in communication, as appropriate). The hardware elements may include a processing unit(s) 1110 which can include without limitation one or more general-purpose processors, one or more special-purpose processors (such as digital signal processing (DSP) chips, graphics processing units (GPUs), application specific integrated circuits (ASICs), and/or the like), and/or other processor, processing structure, or processing means. As shown in FIG. 11, some embodiments may have a separate Digital Signal Processor (DSP) 1120, depending on desired functionality. Location determination and/or other determinations based on wireless communication may be provided in the processing unit(s) 1110 and/or wireless communication interface 1130 (discussed below). The mobile device 110 also can include one or more input devices 1170, which can include without limitation a keyboard, touch screen, a touch pad, microphone, button(s), dial(s), switch(es), and/or the like; and one or more output devices 1115, which can include without limitation a display, light emitting diode (LED), speakers, and/or the like. As will be appreciated, the type of input devices 1170 and output devices 1115 may depend on the type of mobile device 110 with which the input devices 1170 and output devices 1115 are integrated.

The mobile device 110 may also include a wireless communication interface 1130, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX™ device, a Wide Area Network (WAN) device and/or various cellular devices, etc.), and/or the like, which may enable the mobile device 110 to communicate via networks and/or directly with other devices as described herein. The wireless communication interface 1130 may permit data and signaling to be communicated (e.g. transmitted and received) with a network, for example, via WAN access points, cellular base stations and/or other access node types, and/or other network components, computer systems, and/or any other electronic devices described herein. The communication can be carried out via one or more wireless communication antenna(s) 1132 that send and/or receive wireless signals 1134. The antenna(s) 1132 may comprise one or more discrete antennas, one or more antenna arrays, or any combination.

Depending on desired functionality, the wireless communication interface 1130 may comprise separate transceivers, a separate receiver and transmitter, or any combination of transceivers, transmitters, and/or receivers to communicate with base stations and other terrestrial transceivers, such as wireless devices and access points. The mobile device 110 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX™ (IEEE 802.16) network, and so on. A CDMA network may implement one or more radio access technologies (RATs) such as CDMA2000®, Wideband CDMA (WCDMA), and so on. CDMA2000® includes IS-95, IS-2000, and/or IS-856 standards. A TDMA network may implement Global System for Mobile Communications (GSM), Digital Advanced Mobile Phone System (D-AMPS), or some other RAT. An OFDMA network may employ Long-Term Evolution (LTE), LTE Advanced, 5G NR, 6G, and so on. 5G NR, LTE, LTE Advanced, GSM, and WCDMA are described in documents from the Third Generation Partnership Project (3GPP™). CDMA2000® is described in documents from a consortium named "3rd Generation Partnership Project 2" (3GPP2). 3GPP™ and 3GPP2 documents are publicly available. A wireless local area network (WLAN) may also be an IEEE 802.11x network, and a wireless personal area network (WPAN) may be a Bluetooth® network, an IEEE 802.15x, or some other type of network. The techniques described herein may also be used for any combination of WWAN, WLAN and/or WPAN.

The mobile device 110 can further include sensor(s) 1140. Sensors 1140 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to complement and/or facilitate the location determination described herein, in some instances.

Embodiments of the mobile device 110 may also include a GNSS receiver 1180 capable of receiving signals 1184 from one or more GNSS satellites (e.g., SVs 140) as described herein using an antenna 1182 (which could be the same as antenna 1132). The GNSS receiver 1180 can extract a position of the mobile device 110, using conventional techniques, from GNSS SVs of a GNSS system (e.g., SVs 140 of FIG. 3), such as GPS, GAL, Global Navigation Satellite System (GLONASS), Quasi-Zenith Satellite System (QZSS) over Japan, Indian Regional Navigational Satellite System (IRNSS) over India, Beidou Navigation Satellite System (BDS) over China, and/or the like. Moreover, the GNSS receiver 1180 can be used with various augmentation systems (e.g., Satellite-based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1180 illustrated in FIG. 11 is illustrated as a component distinct from other components within a mobile device 110, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 1110, DSP 1120, and/or a processing unit within the wireless communication interface 1130 (e.g., in a modem). A GNSS receiver may optionally also include a positioning engine, such as those described herein (e.g., a an EKF/Kalman filter, WLS, hatch filter, particle filter, etc.), which can use GNSS measurements from the measurement engine and RTK/D GNSS correction information to determine a position of the GNSS receiver. The positioning engine may also be executed by one or more processing units, such as processing unit(s) 1110 and/or DSP 1120.

The mobile device 110 may further include and/or be in communication with a memory 1160. The memory 1160 may comprise a machine- or computer-readable medium, which can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1160 of the mobile device 110 also can comprise software elements (not shown in FIG. 11), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1160 that are executable by the mobile device 110 (and/or processing unit(s) 1110 or DSP 1120 within mobile device 110). In an aspect, then, such code and/or instructions can be used to configure and/or adapt a general-purpose computer (or other device) to perform one or more operations in accordance with the described methods.

FIG. 12 is a block diagram of an embodiment of a computer system 1200, which may be utilized and/or incorporated into a service provider 170, reference station 120, base station, computer server, and/or other device described herein. FIG. 12 provides a block diagram of one embodiment of a computer system 1200 that can perform the methods provided by various other embodiments, such as the methods described in relation to FIGS. 1-9. It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner. In addition, as with the components of FIG. 11, components illustrated by FIG. 12 can be localized to a single device and/or distributed among various networked devices, which may be disposed at different physical or geographical locations.

The computer system 1200 is shown comprising hardware elements that can be electrically coupled via a bus 1205 (or may otherwise be in communication, as appropriate). The hardware elements may include processing unit(s) 1210, which can include without limitation one or more general-purpose processors, one or more special-purpose processors (such as DSPs, ASICs, GPUs, and/or the like), and/or other processing structure, which can be configured to perform one or more of the methods described herein, including the method described in relation to FIGS. 9A and 9B. The computer system 1200 also can include one or more input devices 1215, which can include without limitation a mouse, a keyboard, a camera, a microphone, and/or the like; and one or more output devices 1220, which can include without limitation a display device, a printer, and/or the like. The type of input devices 1215 and output devices 1220 may depend on the type computer system 1200 with which the input devices 1215 and output devices 1220 are integrated.

The computer system 1200 may further include (and/or be in communication with) one or more non-transitory storage devices 1225, which can comprise, without limitation, local and/or network accessible storage, and/or can include, without limitation, a disk drive, a drive array, an optical storage device, a solid-state storage device, such as a RAM, and/or ROM, which can be programmable, flash-updateable, and/or the like. Such storage devices may be configured to implement any appropriate data stores, including without limitation, various file systems, database structures, and/or the like.

The computer system 1200 may also include a communications subsystem 1230, which can include support of wireline communication technologies and/or wireless communication technologies (in some embodiments) managed and controlled by a wireless communication interface 1233. The communications subsystem 1230 may include a modem, a network card (wireless or wired), an infrared communication device, a wireless communication device, and/or a chipset, and/or the like. The communications subsystem 1230 may include one or more input and/or output communication interfaces, such as the wireless communication interface 1233, to permit data and signaling to be exchanged with a network, mobile devices, other computer systems, and/or any other electronic devices described herein. Specifically, where the computer system 1200 comprises a base station, the wireless communication interface 1233 can allow the base station to wirelessly communicate with one or more mobile devices 110.

In many embodiments, the computer system 1200 will further comprise a working memory 1235, which can include a RAM and/or or ROM device. Software elements, shown as being located within the working memory 1235, can include an operating system 1240, device drivers, executable libraries, and/or other code, such as application(s) 1245, which may comprise computer programs provided by various embodiments, and/or may be designed to implement methods, and/or configure systems, provided by other embodiments, as described herein. Merely by way of example, one or more procedures described with respect to the method(s) discussed above, such as the method described in relation to FIGS. 9A and 9B, may be implemented as code and/or instructions that are stored (e.g. temporarily) in working memory 1235 and are executable by a computer (and/or a processing unit within a computer such as processing unit(s) 1210); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1225 described above. In some cases, the storage medium might be incorporated within a computer system, such as computer system 1200. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1200 and/or might take the form of source and/or installable code, which, upon compilation and/or installation on the computer system 1200 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device or system is capable of manipulating or transforming signals, typically represented as physical electronic, electrical, or magnetic quantities within memories, registers, or other information storage devices, transmission devices, or display devices of the special purpose computer or similar special purpose electronic computing device or system.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure as defined by the appended claims. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1: A method of providing reference station correction data to a mobile device for Real-Time Kinematic (RTK) or Differential Global Navigation Satellite System (DGNSS) corrections, the method comprising: receiving information indicative of an approximate location of the mobile device or information regarding satellite vehicles visible to the mobile device; selecting a plurality of reference stations from which to obtain the reference station correction data, wherein the selecting is based, at least in part, on the approximate location of the mobile device or the information regarding satellite vehicles visible to the mobile device; obtaining the reference station correction data from each reference station of the plurality of reference stations, wherein, for each reference station, the reference station correction data comprises data based on one or more measurements taken by a GNSS receiver at the respective reference station; and sending the reference station correction data to the mobile device.

Clause 2: The method of clause 1, wherein selecting the plurality of reference stations is additionally based on a respective location of each reference station of the plurality of reference stations.

Clause 3: The method of clause 1 or 2, wherein selecting the plurality of reference stations is based on a proximity of the respective location of each reference station of the plurality of reference stations to the approximate location of the mobile device.

Clause 4: The method of clause 1 or 2, wherein the plurality of reference stations are selected to minimize a distance between a midpoint or centroid of the reference station locations and the approximate location of the mobile device.

Clause 5: The method of clause 1, wherein the plurality of reference stations are selected to maximize a number of common-view GNSS satellites between the mobile device and the plurality of reference stations.

Clause 6: The method of clause 5, wherein, to maximize the number of common-view GNSS satellites between the mobile device and the plurality of reference stations, the method further comprises: obtaining information from each reference station of the plurality of reference stations indicative of GNSS satellites viewable by the respective reference station, or obtaining information from the mobile device indicative of GNSS satellites viewable by the mobile device, or both.

Clause 7: The method of any of clauses 1-6, wherein selecting the plurality of reference stations comprises determining a number of reference stations included in the plurality of reference stations.

Clause 8: The method of clause 7, wherein the number of reference stations is determined based on at least one of a quality of service (QOS), a user request from the mobile device, or an application of the mobile device.

Clause 9: The method of any of clauses 1-8, wherein sending the reference station correction data to the mobile device comprises transmitting the reference station correction data from one or more mobile network base stations.

Clause 10: The method of clause 9, wherein the approximate location of the mobile device is in a first coverage area of the one or more mobile network base stations, and wherein the method further comprises sending reference station correction data from a different plurality of reference stations to a second mobile device in a second coverage area of the one or more mobile network base stations.

Clause 11: A method of applying Real-Time Kinematic (RTK) or Differential Global Navigation Satellite System (DGNSS) corrections at a mobile device, the method comprising: obtaining, at the mobile device, reference station correction data from each reference station of a plurality of reference stations, wherein, for each reference station, the reference station correction data comprises one or more measurements taken by a GNSS receiver at the respective reference station; obtaining mobile device measurement data, wherein the mobile device measurement data comprises one or more measurements taken by a GNSS receiver at the mobile device; and determining a location of the mobile device based on the reference station correction data from each reference station of the plurality of reference stations and the mobile device measurement data.

Clause 12: The method of clause 11, wherein determining the location of the mobile device comprises: for each reference station of the plurality of reference stations, determining an estimated location of the mobile device based on the reference station correction data from the respective reference station and the mobile device measurement data; and determining the location of the mobile device based on the estimated locations.

Clause 13: The method of clause 12, wherein determining the location of the mobile device based on the estimated locations comprises taking a simple average or weighted average of at least some of the estimated locations.

Clause 14: The method of clause 11, wherein determining the location of the mobile device comprises using a single Kalman filter to process the reference station correction data from the plurality of reference stations.

Clause 15: The method of any of clauses 11-14, further comprising verifying an accuracy of the determined location of the mobile device using a carrier phase integer ambiguity or position vector from at least two of the plurality of reference stations.

Clause 16: The method of clause 15, further comprising: disregarding the reference station correction data from one or more reference stations of the plurality of reference stations based on the verifying of the accuracy of the determined location of the mobile device; and determining a refined location of the mobile device based on remaining reference station correction data from the plurality of reference stations and the mobile device measurement data.

Clause 17: The method of any of clauses 11-16, further comprising transmitting a request for the reference station correction data to a provider service.

Clause 18: The method of clause 17, wherein the request includes information indicative of an approximate location of the mobile device.

Clause 19: The method of clause 17 or 18, wherein the request includes at least one of a quality of service (QOS) or a number of reference stations to be included in the plurality of reference stations.

Clause 20: The method of any of clauses 11-19, wherein obtaining reference station correction data from each reference station of a plurality of reference stations comprises receiving the reference station correction data from one or more mobile network base stations.

Clause 21: The method of clause 20, wherein receiving the reference station correction data from one or more mobile network base stations comprises repeatedly receiving the reference station correction data from the one or more mobile network base stations.

Clause 22: The method of clause 21, wherein a repetition rate of receiving the reference station correction data is based on at least one of a bandwidth of a wireless communication with the one or more mobile network base stations or a performance requirement for the determination of the location of the mobile device.

Clause 23: A computer server for providing reference station correction data to a mobile device for Real-Time Kinematic (RTK) or Differential Global Navigation Satellite System (DGNSS) corrections, the computer server comprising: a transceiver; a memory; and one or more processing units communicatively coupled with the transceiver and the memory, the one or more processing units configured to: receive information indicative of an approximate location of the mobile device or information regarding satellite vehicles visible to the mobile device; select a plurality of reference stations from which to obtain the reference station correction data, wherein the selecting is based, at least in part, on the approximate location of the mobile device or the information regarding satellite vehicles visible to the mobile device; obtain the reference station correction data from each reference station of the plurality of reference stations, wherein, for each reference station, the reference station correction data comprises data based on one or more measurements taken by a GNSS receiver at the respective reference station; and send, via the transceiver, the reference station correction data to the mobile device.

Clause 24: The computer server of clause 23, wherein the one or more processing units are configured to select the plurality of reference stations additionally based on a respective location of each reference station of the plurality of reference stations.

Clause 25: The computer server of clause 23 or 24, wherein the one or more processing units are configured to select the plurality of reference stations additionally based on a proximity of the respective location of each reference station of the plurality of reference stations to the approximate location of the mobile device.

Clause 26: The computer server of clause 23 or 24, wherein the one or more processing units are configured to select the plurality of reference stations to minimize a distance between a midpoint or centroid of the reference station locations and the approximate location of the mobile device.

Clause 27: The computer server of clause 23, wherein the one or more processing units are configured to select the plurality of reference stations to maximize a number of common-view GNSS satellites between the mobile device and the plurality of reference stations.

Clause 28: The computer server of clause 27, wherein, to maximize the number of common-view GNSS satellites between the mobile device and the plurality of reference stations, the one or more processing units are configured to: obtain information from each reference station of the plurality of reference stations indicative of GNSS satellites viewable by the respective reference station, or obtain information from the mobile device indicative of GNSS satellites viewable by the mobile device, or both.

Clause 29: The computer server of any of clauses 23-28, wherein, to select the plurality of reference stations, the one or more processing units are configured to determine a number of reference stations included in the plurality of reference stations.

Clause 30: The computer server of clause 29, wherein the one or more processing units are configured to determine the number of reference stations based on at least one of a quality of service (QOS), a user request from the mobile device, or an application of the mobile device.

Clause 31: The computer server of any of clauses 23-30, wherein, to send the reference station correction data to the mobile device, the one or more processing units are configured to transmit the reference station correction data from one or more mobile network base stations.

Clause 32: The computer server of any of clauses 23-31, wherein, if the approximate location of the mobile device is in a first coverage area of the one or more mobile network base stations, the one or more processing units are configured to send reference station correction data from a different plurality of reference stations to a second mobile device in a second coverage area of the one or more mobile network base stations.

Clause 33: A mobile device for applying Real-Time Kinematic (RTK) or Differential Global Navigation Satellite System (DGNSS) corrections, the mobile device comprising: a transceiver; a GNSS receiver, a memory; and one or more processing units communicatively coupled with the transceiver, GNSS receiver, and the memory, the one or more processing units configured to: obtain, via the transceiver, reference station correction data from each reference station of a plurality of reference stations, wherein, for each reference station, the reference station correction data comprises one or more measurements taken by a GNSS receiver at the respective reference station; obtain mobile device measurement data, wherein the mobile device measurement data comprises one or more measurements taken by the GNSS receiver of the mobile device; and determine a location of the mobile device based on the reference station correction data from each reference station of the plurality of reference stations and the mobile device measurement data.

Clause 34: The mobile device of clause 33, wherein, to determine the location of the mobile device, the one or more processing units are configured to: determine, for each reference station of the plurality of reference stations, an estimated location of the mobile device based on the reference station correction data from the respective reference station and the mobile device measurement data; and determine the location of the mobile device based on the estimated locations.

Clause 35: The mobile device of clause 34, wherein, to determine the location of the mobile device based on the estimated locations, the one or more processing units are configured to take a simple average or weighted average of at least some of the estimated locations.

Clause 36: The mobile device of clause 33, wherein, to determine the location of the mobile device, the one or more processing units are configured to use a single Kalman filter to process the reference station correction data from the plurality of reference stations.

Clause 37: The mobile device of any of clauses 33-36, wherein the one or more processing units are further configured to verify an accuracy of the determined location of the mobile device using a carrier phase integer ambiguity or position vector from at least two of the plurality of reference stations.

Clause 38: The mobile device of clause 37, wherein the one or more processing units are further configured to: disregard the reference station correction data from one or more reference stations of the plurality of reference stations based on the verifying of the accuracy of the determined location of the mobile device; and determine a refined location of the mobile device based on remaining reference station correction data from the plurality of reference stations and the mobile device measurement data.

Clause 39: The mobile device of any of clauses 33-38, wherein the one or more processing units are further configured to transmit, via the transceiver, a request for the reference station correction data to a provider service.

Clause 40: The mobile device of clause 39, wherein the one or more processing units are further configured to include, in the request, information indicative of an approximate location of the mobile device.

Clause 41: The mobile device of clause 39 or 40, wherein the one or more processing units are further configured to include, in the request, at least one of a quality of service (QOS) or a number of reference stations to be included in the plurality of reference stations.

Clause 42: The mobile device of any of clauses 33-41, wherein, to obtain reference station correction data from each reference station of a plurality of reference stations, the one or more processing units are configured to receive the reference station correction data from one or more mobile network base stations.

Clause 43: The mobile device of clause 42, wherein, to receive the reference station correction data from one or more mobile network base stations, the one or more processing units are configured to repeatedly receive the reference station correction data from the one or more mobile network base stations.

Clause 44: The mobile device of clause 43, wherein a repetition rate of receiving the reference station correction data is based on at least one of a bandwidth of a wireless communication with the one or more mobile network base stations or a performance requirement for the determination of the location of the mobile device.

Clause 45: A device for providing reference station correction data to a mobile device for Real-Time Kinematic (RTK) or Differential Global Navigation Satellite System (DGNSS) corrections, the device comprising: means for receiving information indicative of an approximate location of the mobile device or information regarding satellite vehicles visible to the mobile device; means for selecting a plurality of reference stations from which to obtain the reference station correction data, wherein the selecting is based, at least in part, on the approximate location of the mobile device or the information regarding satellite vehicles visible to the mobile device; means for obtaining the reference station correction data from each reference station of the plurality of reference stations, wherein, for each reference station, the reference station correction data comprises data based on one or more measurements taken by a GNSS receiver at the respective reference station; and means for sending the reference station correction data to the mobile device.

Clause 46: The device of clause 45, wherein selecting the plurality of reference stations is additionally based on a respective location of each reference station of the plurality of reference stations.

Clause 47: The device of clause 45 or 46, wherein selecting the plurality of reference stations is based on a proximity of the respective location of each reference station of the plurality of reference stations to the approximate location of the mobile device.

Clause 48: The device of clause 45 or 46, wherein the means for selecting a plurality of reference stations comprise means for selecting the plurality of reference stations to minimize a distance between a midpoint or centroid of the reference station locations and the approximate location of the mobile device.

Clause 49: The device of clause 45, wherein the means for selecting a plurality of reference stations comprise means for selecting the plurality of reference stations to maximize a number of common-view GNSS satellites between the mobile device and the plurality of reference stations.

Clause 50: The device of clause 49, wherein, to maximize the number of common-view GNSS satellites between the mobile device and the plurality of reference stations, the device further comprises: means for obtaining information from each reference station of the plurality of reference stations indicative of GNSS satellites viewable by the respective reference station, or means for obtaining information from the mobile device indicative of GNSS satellites viewable by the mobile device, or both.

Clause 51: The device of any of clauses 45-50, wherein the means for selecting the plurality of reference stations comprises means for determining a number of reference stations included in the plurality of reference stations.

Clause 52: The device of clause 51, wherein the number of reference stations is determined based on at least one of a quality of service (QOS), a user request from the mobile device, or an application of the mobile device.

Clause 53: The device of any of clauses 45-52, wherein the means for sending the reference station correction data to the mobile device comprises means for transmitting the reference station correction data from one or more mobile network base stations.

Clause 54: A device for applying Real-Time Kinematic (RTK) or Differential Global Navigation Satellite System (DGNSS) corrections at a mobile device, the device comprising: means for obtaining, at the mobile device, reference station correction data from each reference station of a plurality of reference stations, wherein, for each reference station, the reference station correction data comprises one or more measurements taken by a GNSS receiver at the respective reference station; means for obtaining mobile device measurement data, wherein the mobile device measurement data comprises one or more measurements taken by a GNSS receiver at the mobile device; and means for determining a location of the mobile device based on the reference station correction data from each reference station of the plurality of reference stations and the mobile device measurement data.

Clause 55: The device of clause 54, wherein the means for determining the location of the mobile device comprises: means for determining, for each reference station of the plurality of reference stations, an estimated location of the mobile device based on the reference station correction data from the respective reference station and the mobile device measurement data; and means for determining the location of the mobile device based on the estimated locations.

Clause 56: The device of clause 55, wherein the means for determining the location of the mobile device based on the estimated locations comprises means for taking a simple average or weighted average of at least some of the estimated locations.

Clause 57: The device of clause 54, wherein the means for determining the location of the mobile device comprises means for using a single Kalman filter to process the reference station correction data from the plurality of reference stations.

Clause 58: The device of any of clauses 54-57, further comprising means for verifying an accuracy of the determined location of the mobile device using a carrier phase integer ambiguity or position vector from at least two of the plurality of reference stations.

Clause 59: The device of clause 58, further comprising: means for disregarding the reference station correction data from one or more reference stations of the plurality of reference stations based on the verifying of the accuracy of the determined location of the mobile device; and means for determining a refined location of the mobile device based on remaining reference station correction data from the plurality of reference stations and the mobile device measurement data.

Clause 60: The device of any of clauses 54-59, further comprising means for transmitting a request for the reference station correction data to a provider service.

Clause 61: The device of clause 60, further comprising means for including, in the request, information indicative of an approximate location of the mobile device.

Clause 62: The device of clause 60 or 61, further comprising means for including, in the request, at least one of a quality of service (QOS) or a number of reference stations to be included in the plurality of reference stations.

Clause 63: The device of any of clauses 54-62, wherein the means for obtaining reference station correction data from each reference station of a plurality of reference stations comprises means for receiving the reference station correction data from one or more mobile network base stations.

Clause 64: The device of clause 63, wherein the means for receiving the reference station correction data from one or more mobile network base stations comprises means for repeatedly receiving the reference station correction data from the one or more mobile network base stations.

Clause 65: The device of clause 64, wherein a repetition rate of receiving the reference station correction data is based on at least one of a bandwidth of a wireless communication with the one or more mobile network base stations or a performance requirement for the determination of the location of the mobile device.

Clause 66: A non-transitory computer-readable medium storing instructions for providing reference station correction data to a mobile device for Real-Time Kinematic (RTK) or Differential Global Navigation Satellite System (DGNSS) corrections, the instructions comprising code for: receiving information indicative of an approximate location of the mobile device or information regarding satellite vehicles visible to the mobile device; selecting a plurality of reference stations from which to obtain the reference station correction data, wherein the selecting is based, at least in part, on the approximate location of the mobile device or the information regarding satellite vehicles visible to the mobile device; obtaining the reference station correction data from each reference station of the plurality of reference stations, wherein, for each reference station, the reference station correction data comprises data based on one or more measurements taken by a GNSS receiver at the respective reference station; and sending the reference station correction data to the mobile device.

Clause 67: The non-transitory computer-readable medium of clause 66, wherein selecting the plurality of reference stations is additionally based on a respective location of each reference station of the plurality of reference stations.

Clause 68: The non-transitory computer-readable medium of clause 66 or 67, wherein selecting the plurality of reference stations is based on a proximity of the respective location of each reference station of the plurality of reference stations to the approximate location of the mobile device.

Clause 69: The non-transitory computer-readable medium of clause 66 or 67, wherein the code for selecting the plurality of reference stations comprises code for selecting the plurality of reference stations to minimize a distance between a midpoint or centroid of the reference station locations and the approximate location of the mobile device.

Clause 70: The non-transitory computer-readable medium of clause 66, wherein the code for selecting the plurality of reference stations comprises code for selecting the plurality of reference stations to maximize a number of common-view GNSS satellites between the mobile device and the plurality of reference stations.

Clause 71: The non-transitory computer-readable medium of clause 70, wherein, to maximize the number of common-view GNSS satellites between the mobile device and the plurality of reference stations, the instructions further comprise code for: obtaining information from each reference station of the plurality of reference stations indicative of GNSS satellites viewable by the respective reference station, or obtaining information from the mobile device indicative of GNSS satellites viewable by the mobile device, or both.

Clause 72: The non-transitory computer-readable medium of any of clauses 66-71, wherein the code for selecting the plurality of reference stations comprises code for determining a number of reference stations included in the plurality of reference stations.

Clause 73: The non-transitory computer-readable medium of clause 72, wherein the number of reference stations is determined based on at least one of a quality of service (QOS), a user request from the mobile device, or an application of the mobile device.

Clause 74: The non-transitory computer-readable medium of any of clauses 66-73, wherein the code for sending the reference station correction data to the mobile device comprises code for transmitting the reference station correction data to one or more mobile network base stations.

Clause 75: A non-transitory computer-readable medium storing instructions for applying Real-Time Kinematic (RTK) or Differential Global Navigation Satellite System (DGNSS) corrections at a mobile device, the instructions comprising code for: obtaining, at the mobile device, reference station correction data from each reference station of a plurality of reference stations, wherein, for each reference station, the reference station correction data comprises one or more measurements taken by a GNSS receiver at the respective reference station; obtaining mobile device measurement data, wherein the mobile device measurement data comprises one or more measurements taken by a GNSS receiver at the mobile device; and determining a location of the mobile device based on the reference station correction data from each reference station of the plurality of reference stations and the mobile device measurement data.

Clause 76: The non-transitory computer-readable medium of clause 75, wherein the code for determining the location of the mobile device comprises code for: for each reference station of the plurality of reference stations, determining an estimated location of the mobile device based on the reference station correction data from the respective reference station and the mobile device measurement data; and determining the location of the mobile device based on the estimated locations.

Clause 77: The non-transitory computer-readable medium of clause 76, wherein the code for determining the location of the mobile device based on the estimated locations comprises code for taking a simple average or weighted average of at least some of the estimated locations.

Clause 78: The non-transitory computer-readable medium of clause 75, wherein the code for determining the location of the mobile device comprises code for using a single Kalman filter to process the reference station correction data from the plurality of reference stations.

Clause 79: The non-transitory computer-readable medium of any of clauses 75-78, wherein the instructions further comprise code for verifying an accuracy of the determined location of the mobile device using a carrier phase integer ambiguity or position vector from at least two of the plurality of reference stations.

Clause 80: The non-transitory computer-readable medium of clause 79, wherein the instructions further comprise code for: disregarding the reference station correction data from one or more reference stations of the plurality of reference stations based on the verifying of the accuracy of the determined location of the mobile device; and determining a refined location of the mobile device based on remaining reference station correction data from the plurality of reference stations and the mobile device measurement data.

Clause 81: The non-transitory computer-readable medium of any of clauses 75-80, wherein the instructions further comprise code for transmitting a request for the reference station correction data to a provider service.

Clause 82: The non-transitory computer-readable medium of clause 81, wherein the instructions further comprise code for including, in the request, information indicative of an approximate location of the mobile device.

Clause 83: The non-transitory computer-readable medium of clause 81 or 82, wherein the instructions further comprise code for including, in the request, at least one of a quality of service (QOS) or a number of reference stations to be included in the plurality of reference stations.

Clause 84: The non-transitory computer-readable medium of any of clauses 75-83, wherein the code for obtaining reference station correction data from each reference station of a plurality of reference stations comprises code for receiving the reference station correction data from one or more mobile network base stations.

Clause 85: The non-transitory computer-readable medium of clause 84, wherein the code for receiving the reference station correction data from one or more mobile network base stations comprises code for repeatedly receiving the reference station correction data from the one or more mobile network base stations.

Clause 86: The non-transitory computer-readable medium of clause 85, wherein a repetition rate of receiving the reference station correction data is based on at least one of a bandwidth of a wireless communication with the one or more mobile network base stations or a performance requirement for the determination of the location of the mobile device.

What is claimed is:

1. A method of providing reference station correction data to a mobile device for Real-Time Kinematic (RTK) or Differential Global Navigation Satellite System (DGNSS) corrections, the method comprising:
receiving information indicative of an approximate location of the mobile device or information regarding satellite vehicles visible to the mobile device;
selecting a plurality of reference stations from which to obtain the reference station correction data, wherein the selecting is based, at least in part, on the approximate location of the mobile device or the information regarding satellite vehicles visible to the mobile device;

obtaining the reference station correction data from each reference station of the plurality of reference stations, wherein, for each reference station, the reference station correction data comprises data based on one or more measurements taken by a GNSS receiver at the respective reference station; and sending the reference station correction data to the mobile device.

2. The method of claim 1, wherein selecting the plurality of reference stations is additionally based on a respective location of each reference station of the plurality of reference stations.

3. The method of claim 2, wherein selecting the plurality of reference stations is based on a proximity of the respective location of each reference station of the plurality of reference stations to the approximate location of the mobile device.

4. The method of claim 2, wherein the plurality of reference stations are selected to minimize a distance between a midpoint or centroid of the reference station locations and the approximate location of the mobile device.

5. The method of claim 1, wherein the plurality of reference stations are selected to maximize a number of common-view GNSS satellites between the mobile device and the plurality of reference stations.

6. The method of claim 5, wherein, to maximize the number of common-view GNSS satellites between the mobile device and the plurality of reference stations, the method further comprises:

obtaining information from each reference station of the plurality of reference stations indicative of GNSS satellites viewable by the respective reference station, or obtaining information from the mobile device indicative of GNSS satellites viewable by the mobile device, or both.

7. The method of claim 1, wherein selecting the plurality of reference stations comprises determining a number of reference stations included in the plurality of reference stations.

8. The method of claim 7, wherein the number of reference stations is determined based on at least one of a quality of service (QOS), a user request from the mobile device, or an application of the mobile device.

9. The method of claim 1, wherein sending the reference station correction data to the mobile device comprises transmitting the reference station correction data from one or more mobile network base stations.

10. The method of claim 9, wherein the approximate location of the mobile device is in a first coverage area of the one or more mobile network base stations, and wherein the method further comprises sending reference station correction data from a different plurality of reference stations to a second mobile device in a second coverage area of the one or more mobile network base stations.

11. A method of applying Real-Time Kinematic (RTK) or Differential Global Navigation Satellite System (DGNSS) corrections at a mobile device, the method comprising:

obtaining, at the mobile device reference station correction data from each reference station of a plurality of reference stations, wherein, for each reference station, the reference station correction data comprises one or more measurements taken by a GNSS receiver at the respective reference station, and wherein:

obtaining reference station correction data from each reference station of a plurality of reference stations comprises receiving the reference station correction data from one or more mobile network base stations, obtaining reference station correction data is responsive to transmitting a request for the reference station correction data from the mobile device to a provider service, or both;

obtaining mobile device measurement data, wherein the mobile device measurement data comprises one or more measurements taken by a GNSS receiver at the mobile device; and determining, at the mobile device, a location of the mobile device based on the reference station correction data obtained at the mobile device from each reference station of the plurality of reference stations and the mobile device measurement data.

12. The method of claim 11, wherein determining the location of the mobile device comprises:

for each reference station of the plurality of reference stations, determining an estimated location of the mobile device based on the reference station correction data from the respective reference station and the mobile device measurement data; and determining the location of the mobile device based on the estimated locations.

13. The method of claim 12, wherein determining the location of the mobile device based on the estimated locations comprises taking a simple average or weighted average of at least some of the estimated locations.

14. The method of claim 11, wherein determining the location of the mobile device comprises using a single Kalman filter to process the reference station correction data from the plurality of reference stations.

15. The method of claim 11, further comprising verifying an accuracy of the determined location of the mobile device using a carrier phase integer ambiguity or position vector from at least two of the plurality of reference stations.

16. The method of claim 15, further comprising:

disregarding the reference station correction data from one or more reference stations of the plurality of reference stations based on the verifying of the accuracy of the determined location of the mobile device; and determining a refined location of the mobile device based on remaining reference station correction data from the plurality of reference stations and the mobile device measurement data.

17. The method of claim 11, wherein the request includes information indicative of an approximate location of the mobile device.

18. The method of claim 11, wherein the request includes at least one of a quality of service (QOS) or a number of reference stations to be included in the plurality of reference stations.

19. The method of claim 11, wherein receiving the reference station correction data from one or more mobile network base stations comprises repeatedly receiving the reference station correction data from the one or more mobile network base stations.

20. The method of claim 19, wherein a repetition rate of receiving the reference station correction data is based on at least one of a bandwidth of a wireless communication with the one or more mobile network base stations or a performance requirement for the determination of the location of the mobile device.

21. A computer server for providing reference station correction data to a mobile device for Real-Time Kinematic (RTK) or Differential Global Navigation Satellite System (DGNSS) corrections, the computer server comprising:
- a transceiver;
- a memory; and
- one or more processing units communicatively coupled with the transceiver and the memory, the one or more processing units configured to:
  - receive information indicative of an approximate location of the mobile device or information regarding satellite vehicles visible to the mobile device;
  - select a plurality of reference stations from which to obtain the reference station correction data, wherein the selecting is based, at least in part, on the approximate location of the mobile device or the information regarding satellite vehicles visible to the mobile device;
  - obtain the reference station correction data from each reference station of the plurality of reference stations, wherein, for each reference station, the reference station correction data comprises data based on one or more measurements taken by a GNSS receiver at the respective reference station; and
  - send, via the transceiver, the reference station correction data to the mobile device.

22. The computer server of claim 21, wherein the one or more processing units are configured to select the plurality of reference stations additionally based on a respective location of each reference station of the plurality of reference stations.

23. The computer server of claim 22, wherein the one or more processing units are configured to select the plurality of reference stations additionally based on a proximity of the respective location of each reference station of the plurality of reference stations to the approximate location of the mobile device.

24. The computer server of claim 22, wherein the one or more processing units are configured to select the plurality of reference stations to minimize a distance between a midpoint or centroid of the reference station locations and the approximate location of the mobile device.

25. The computer server of claim 21, wherein the one or more processing units are configured to select the plurality of reference stations to maximize a number of common-view GNSS satellites between the mobile device and the plurality of reference stations.

26. The computer server of claim 25, wherein, to maximize the number of common-view GNSS satellites between the mobile device and the plurality of reference stations, the one or more processing units are configured to:
- obtain information from each reference station of the plurality of reference stations indicative of GNSS satellites viewable by the respective reference station, or
- obtain information from the mobile device indicative of GNSS satellites viewable by the mobile device,
- or both.

27. The computer server of claim 21, wherein, to select the plurality of reference stations, the one or more processing units are configured to determine a number of reference stations included in the plurality of reference stations.

28. The computer server of claim 27, wherein the one or more processing units are configured to determine the number of reference stations based on at least one of a quality of service (QOS), a user request from the mobile device, or an application of the mobile device.

29. The computer server of claim 21, wherein, to send the reference station correction data to the mobile device, the one or more processing units are configured to transmit the reference station correction data from one or more mobile network base stations.

30. The computer server of claim 29, wherein, if the approximate location of the mobile device is in a first coverage area of the one or more mobile network base stations, the one or more processing units are configured to send reference station correction data from a different plurality of reference stations to a second mobile device in a second coverage area of the one or more mobile network base stations.

31. A mobile device for applying Real-Time Kinematic (RTK) or Differential Global Navigation Satellite System (DGNSS) corrections, the mobile device comprising:
- a transceiver;
- a GNSS receiver;
- a memory; and
- one or more processing units communicatively coupled with the transceiver, GNSS receiver, and the memory, the one or more processing units configured to:
  - obtain, via the transceiver, reference station correction data from each reference station of a plurality of reference stations, wherein, for each reference station, the reference station correction data comprises one or more measurements taken by a GNSS receiver at the respective reference station, and wherein:
    - to obtain reference station correction data from each reference station of a plurality of reference stations, the one or more processing units are configured to receive the reference station correction data from one or more mobile network base stations,
    - the one or more processing units are configured to obtain the reference station correction data responsive to transmitting a request for the reference station correction data from the mobile device to a provider service, or
    - both;
  - obtain mobile device measurement data, wherein the mobile device measurement data comprises one or more measurements taken by the GNSS receiver of the mobile device; and
  - determine a location of the mobile device based on the reference station correction data from each reference station of the plurality of reference stations and the mobile device measurement data.

32. The mobile device of claim 31, wherein, to determine the location of the mobile device, the one or more processing units are configured to:
- determine, for each reference station of the plurality of reference stations, an estimated location of the mobile device based on the reference station correction data from the respective reference station and the mobile device measurement data; and
- determine the location of the mobile device based on the estimated locations.

33. The mobile device of claim 32, wherein, to determine the location of the mobile device based on the estimated locations, the one or more processing units are configured to take a simple average or weighted average of at least some of the estimated locations.

34. The mobile device of claim 31, wherein, to determine the location of the mobile device, the one or more processing units are configured to use a single Kalman filter to process the reference station correction data from the plurality of reference stations.

35. The mobile device of claim 31, wherein the one or more processing units are further configured to verify an accuracy of the determined location of the mobile device using a carrier phase integer ambiguity or position vector from at least two of the plurality of reference stations.

36. The mobile device of claim 35, wherein the one or more processing units are further configured to:
  disregard the reference station correction data from one or more reference stations of the plurality of reference stations based on the verifying of the accuracy of the determined location of the mobile device; and
  determine a refined location of the mobile device based on remaining reference station correction data from the plurality of reference stations and the mobile device measurement data.

37. The mobile device of claim 31, wherein the one or more processing units are further configured to include, in the request, information indicative of an approximate location of the mobile device.

38. The mobile device of claim 31, wherein the one or more processing units are further configured to include, in the request, at least one of a quality of service (QOS) or a number of reference stations to be included in the plurality of reference stations.

39. The mobile device of claim 31, wherein, to receive the reference station correction data from one or more mobile network base stations, the one or more processing units are configured to repeatedly receive the reference station correction data from the one or more mobile network base stations.

40. The mobile device of claim 39, wherein a repetition rate of receiving the reference station correction data is based on at least one of a bandwidth of a wireless communication with the one or more mobile network base stations or a performance requirement for the determination of the location of the mobile device.

* * * * *